US007844123B2

(12) United States Patent
Takakura et al.

(10) Patent No.: US 7,844,123 B2
(45) Date of Patent: Nov. 30, 2010

(54) ORTHOGONAL TRANSFORMATION APPARATUS AND IMAGING SYSTEM

(75) Inventors: Kentaro Takakura, Osaka (JP); Shinji Kitamura, Kyoto (JP)

(73) Assignee: Panasonic Corporation, Osaka (JP)

( * ) Notice: Subject to any disclaimer, the term of this patent is extended or adjusted under 35 U.S.C. 154(b) by 811 days.

(21) Appl. No.: 11/822,780

(22) Filed: Jul. 10, 2007

(65) Prior Publication Data

US 2008/0008248 A1 Jan. 10, 2008

(30) Foreign Application Priority Data

Jul. 10, 2006 (JP) ............................... 2006-189130

(51) Int. Cl.
*G06K 9/36* (2006.01)
*H04B 1/66* (2006.01)
*G06K 9/46* (2006.01)

(52) U.S. Cl. ................................ 382/250; 375/240.18

(58) Field of Classification Search ................. 382/232, 382/233, 240, 246, 250, 251, 260–264, 305; 375/240.01, 240.18, 240.2, E7.001, E7.225, 375/E7.226; 348/395.1, 402.1; 358/426.01, 358/426.06
See application file for complete search history.

(56) References Cited

U.S. PATENT DOCUMENTS

| 4,757,383 | A | * | 7/1988 | Tanaka | 375/240.2 |
| 4,792,851 | A | * | 12/1988 | Mochizuki | 348/402.1 |
| 4,797,944 | A | * | 1/1989 | Tanaka | 382/246 |
| 5,184,316 | A | * | 2/1993 | Sugiyama | 708/203 |
| 5,416,854 | A | * | 5/1995 | Fukuda et al. | 382/232 |
| 5,424,778 | A | * | 6/1995 | Sugiyama et al. | 375/240.2 |
| 5,442,399 | A | * | 8/1995 | Asamura et al. | 375/240.01 |
| 5,453,786 | A |   | 9/1995 | Trent |  |
| 5,477,478 | A | * | 12/1995 | Okamoto et al. | 708/402 |
| 5,724,097 | A | * | 3/1998 | Hibi et al. | 375/240.04 |
| 5,838,379 | A | * | 11/1998 | Takayama | 375/240.2 |

(Continued)

FOREIGN PATENT DOCUMENTS

JP 05-153403 6/1993

*Primary Examiner*—Amir Alavi
(74) *Attorney, Agent, or Firm*—McDermott Will & Emery LLP

(57) ABSTRACT

A one-dimensional orthogonal transformation device group constituted with a plurality of one-dimensional orthogonal transformation devices performs one-dimensional orthogonal transformation to the pixel data of one block that is inputted to an input device. A memory device stores the one-dimensional orthogonal transformation data of one block. A selector selects either the pixel data that is inputted via the input device or the one-dimensional orthogonal transformation data that is stored in the memory device, and outputs it to the one-dimensional orthogonal transformation devices. When the pixel data is inputted via the selector, the one-dimensional orthogonal transformation devices generate the one-dimensional orthogonal transformation data by performing first one-dimensional orthogonal transformation processing simultaneously to the pixel data corresponding to a plurality of rows of m-pixels, and store the one-dimensional orthogonal transformation data to the memory device. Further, when the one-dimensional orthogonal transformation data corresponding to the plurality of columns of the n-pixels that are stored in the memory device is inputted sequentially via the selector, the one-dimensional orthogonal transformation devices generate two-dimensional orthogonal transformation data by performing second one-dimensional orthogonal transformation processing to the one-dimensional orthogonal transformation data corresponding to the plurality of columns of the n-pixels.

24 Claims, 17 Drawing Sheets

U.S. PATENT DOCUMENTS

2003/0020965 A1 1/2003 LaRocca et al.
2006/0204119 A1 9/2006 Feng et al.
2008/0008248 A1* 1/2008 Takakura et al. ....... 375/240.18

* cited by examiner

F I G. 1
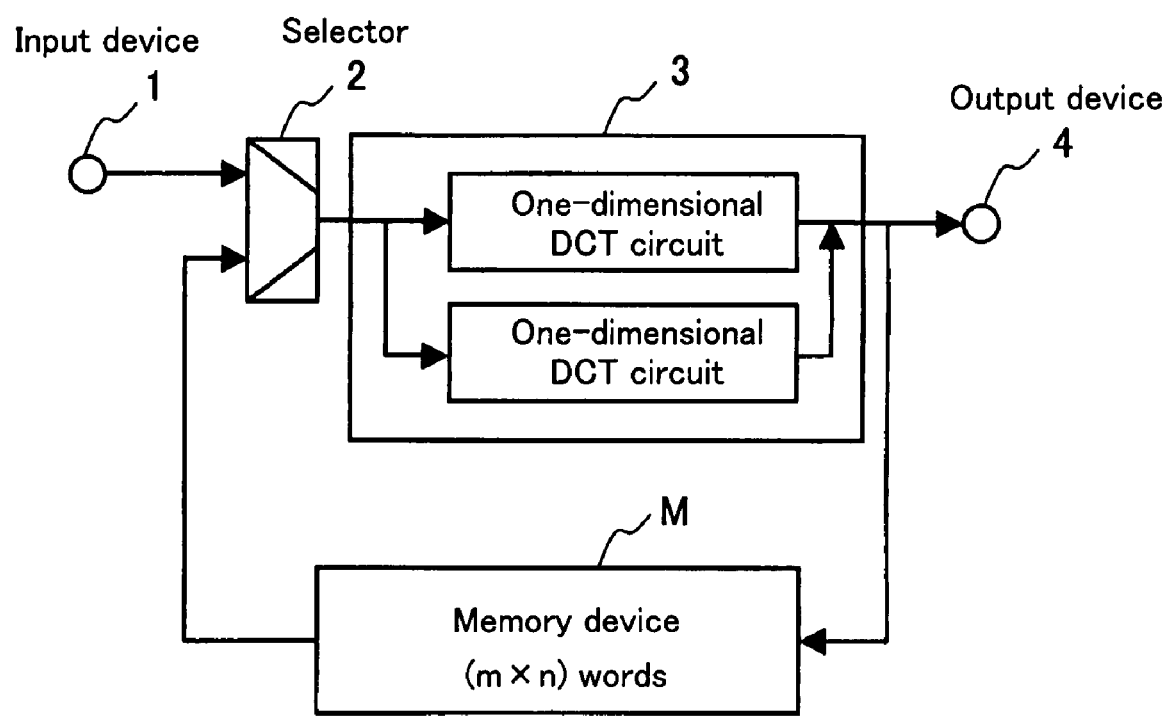

F I G. 4
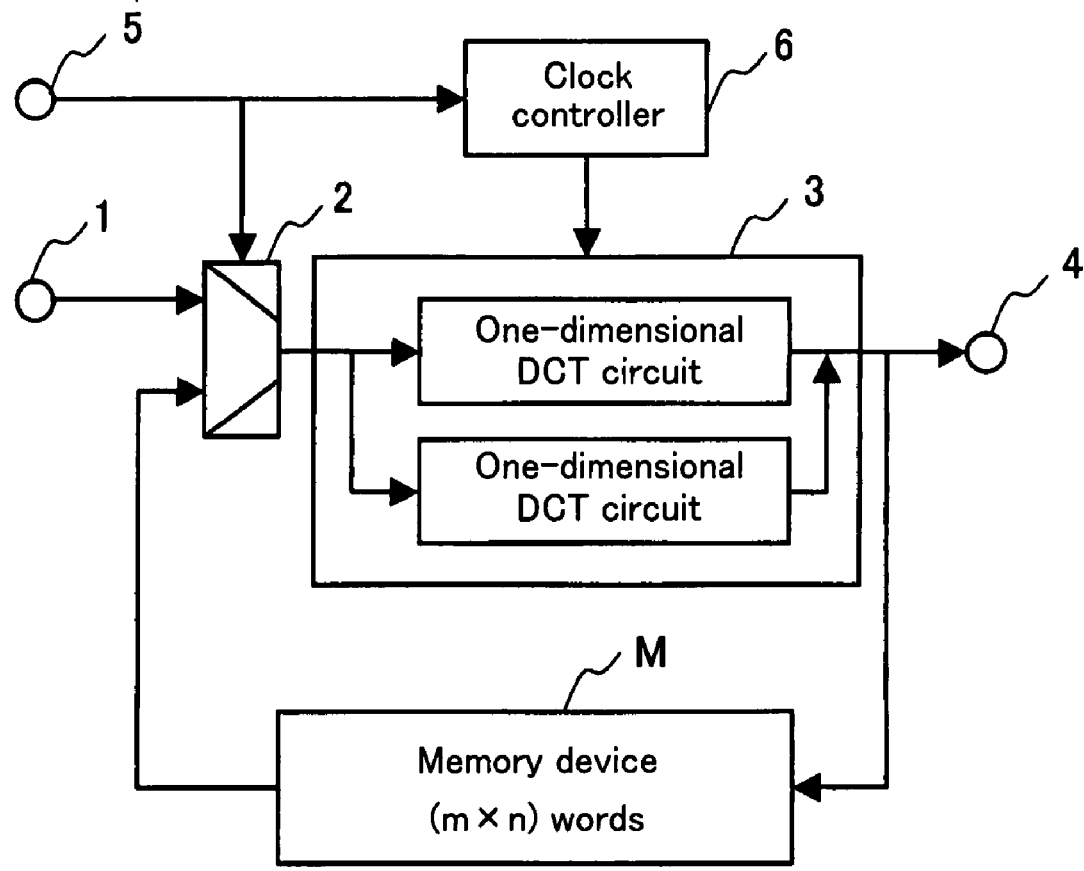

F I G. 5
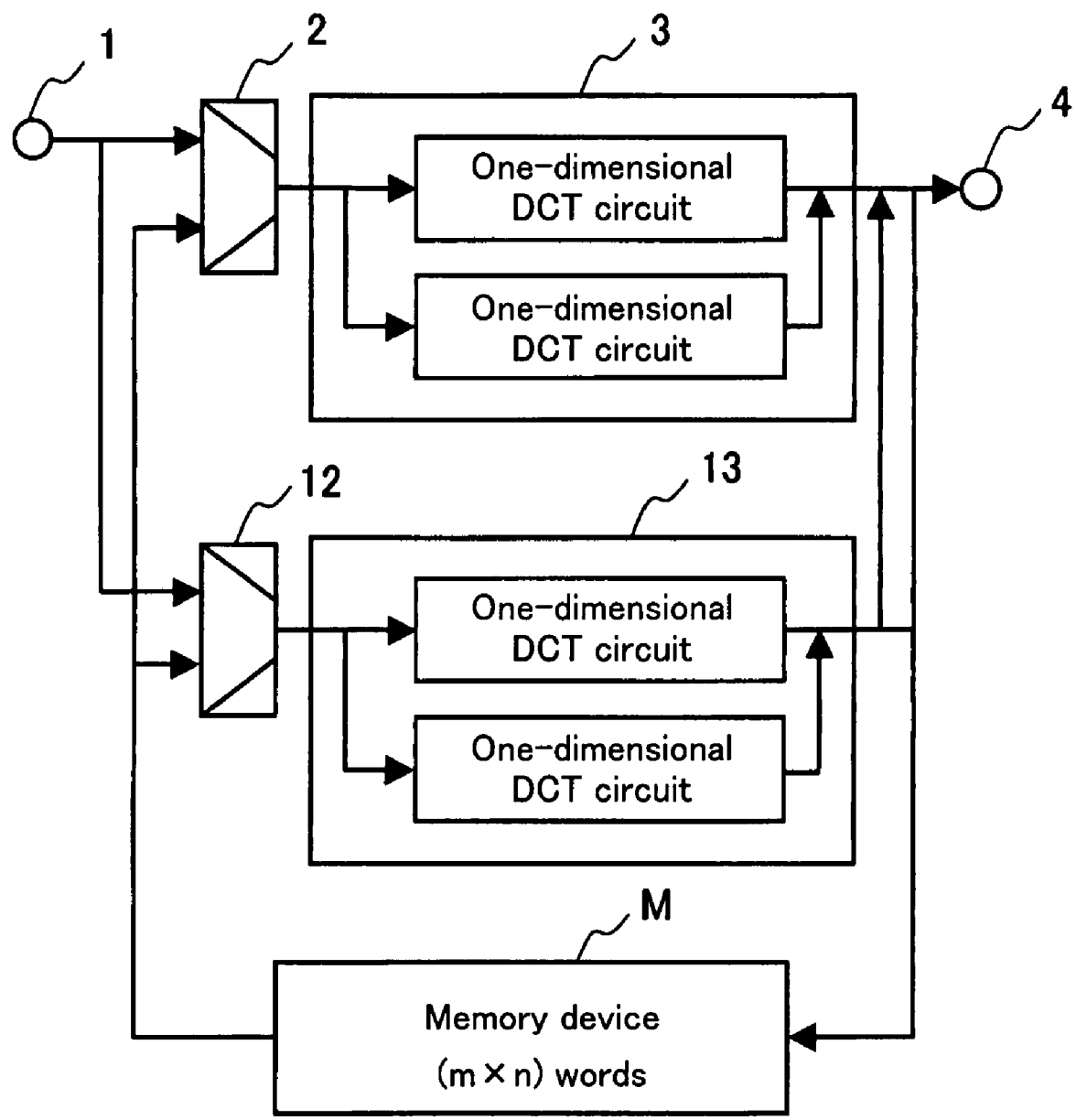

F I G. 7
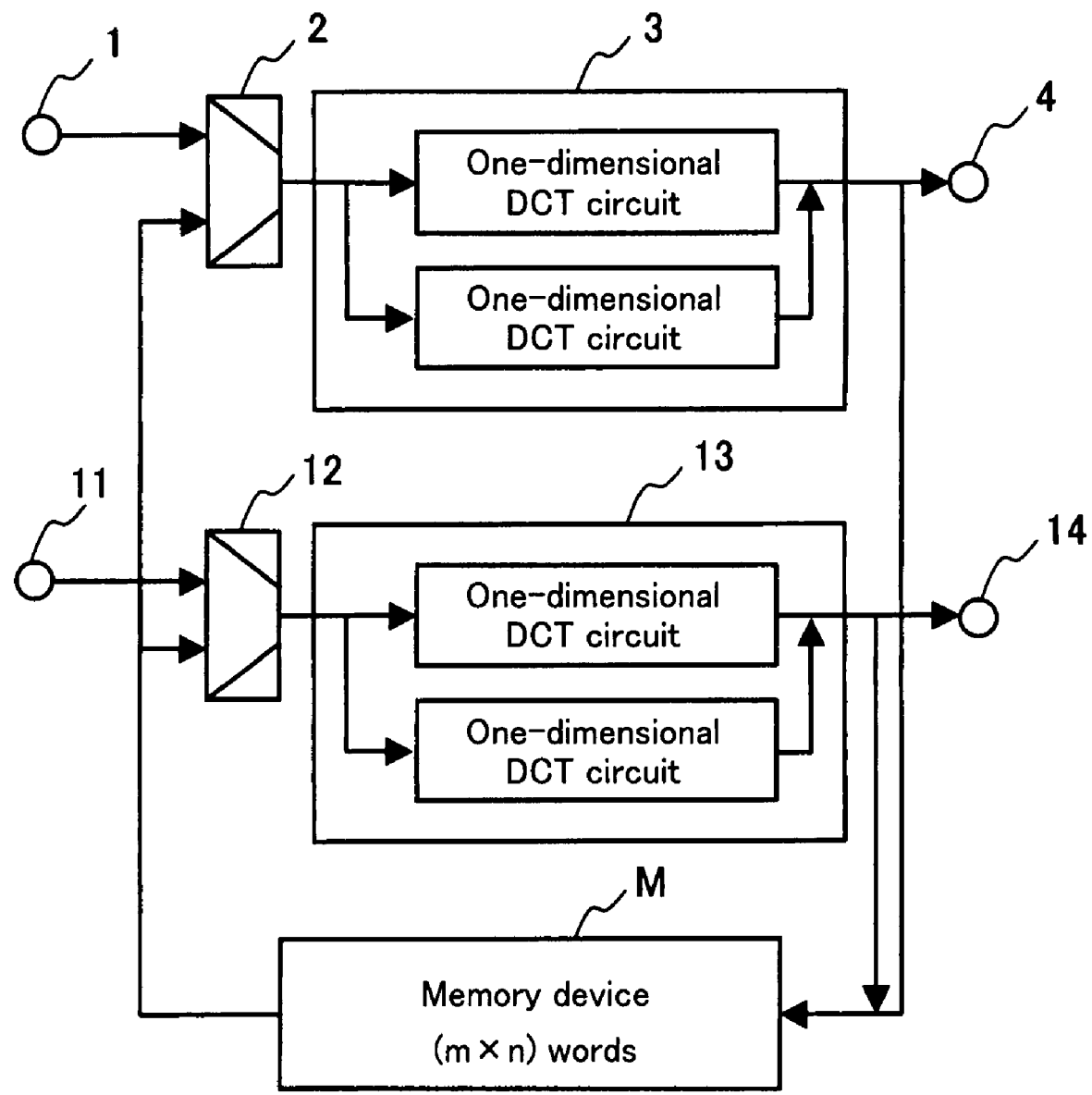

F I G. 1 1
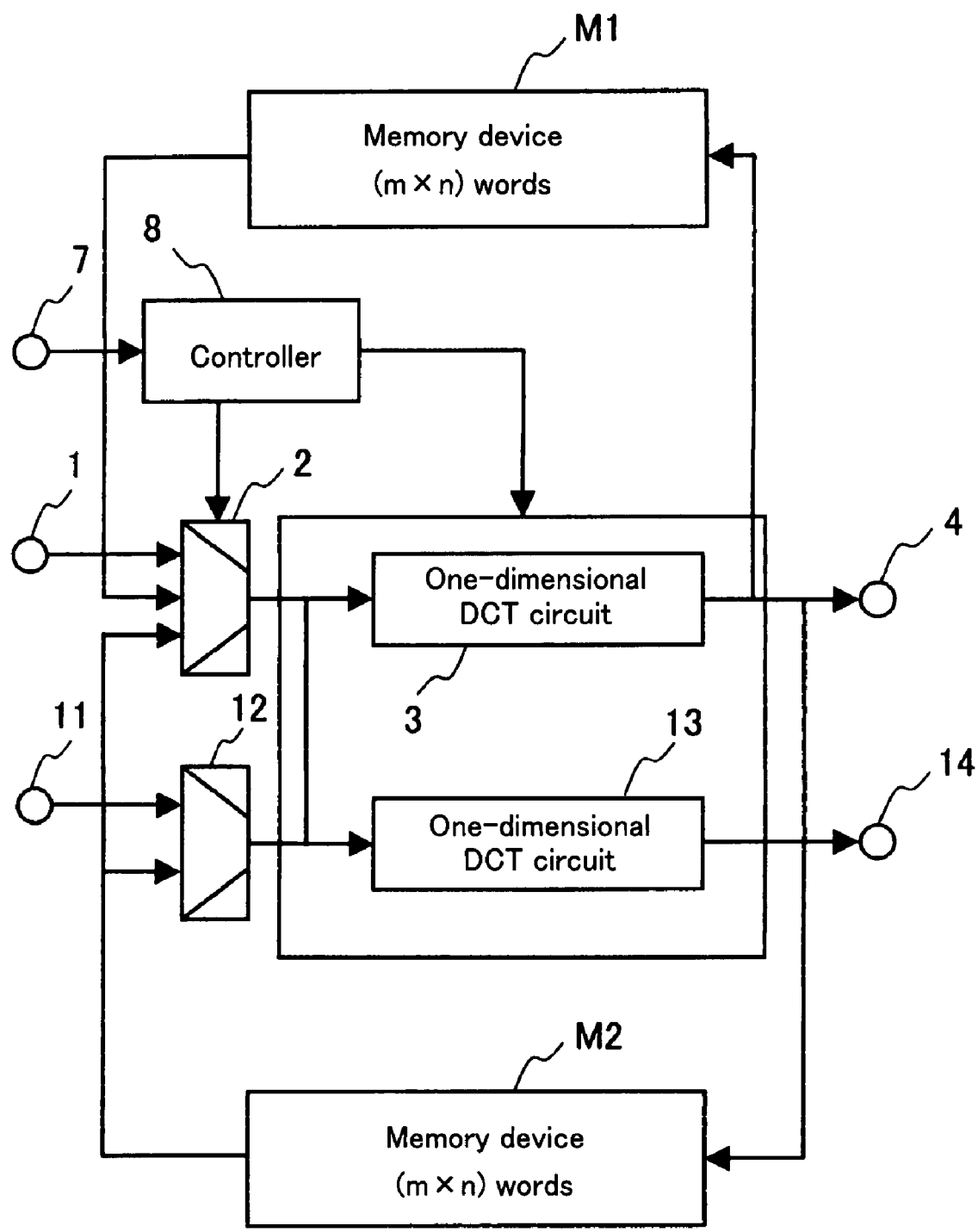

F I G. 1 7
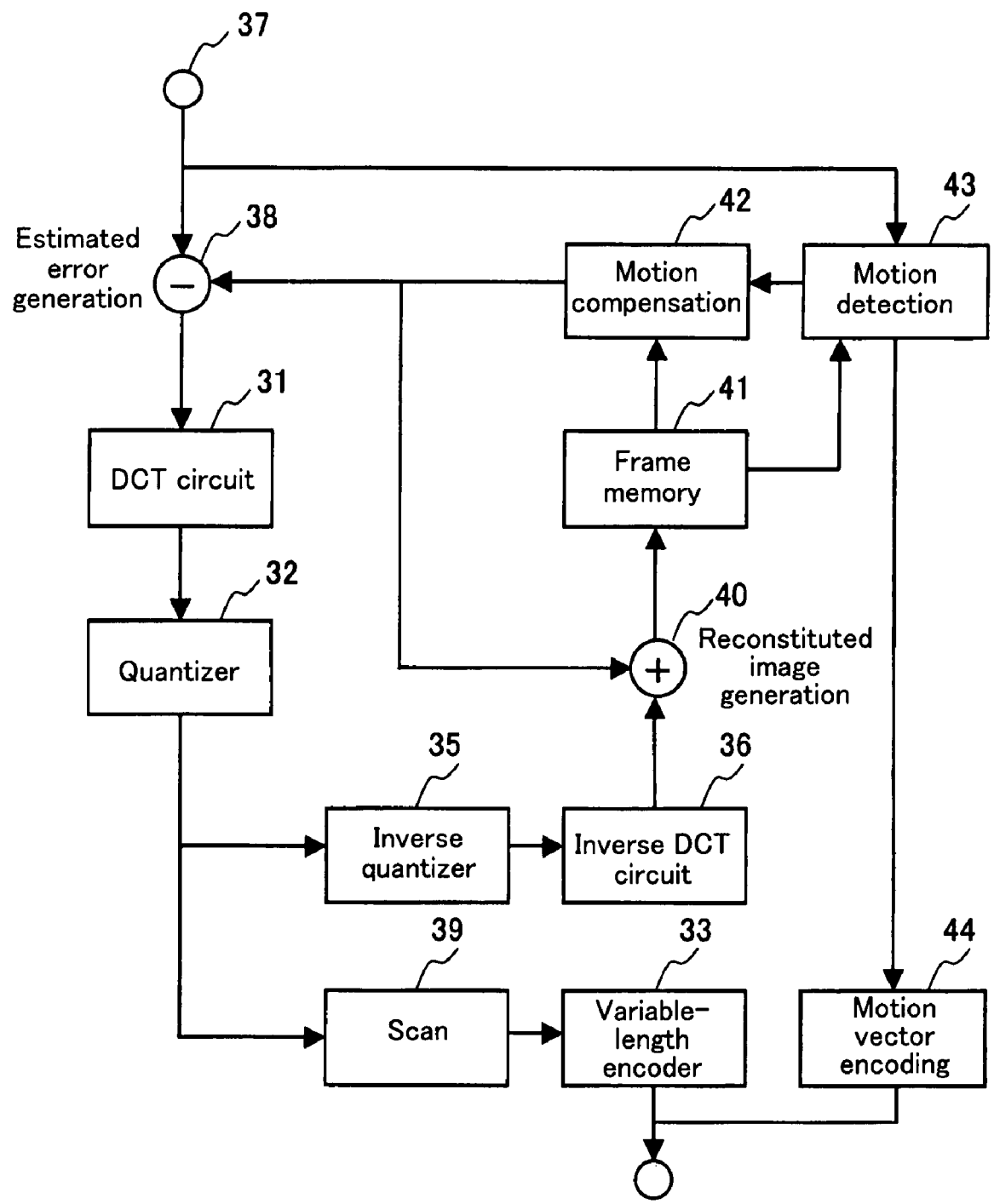

F I G. 1 9
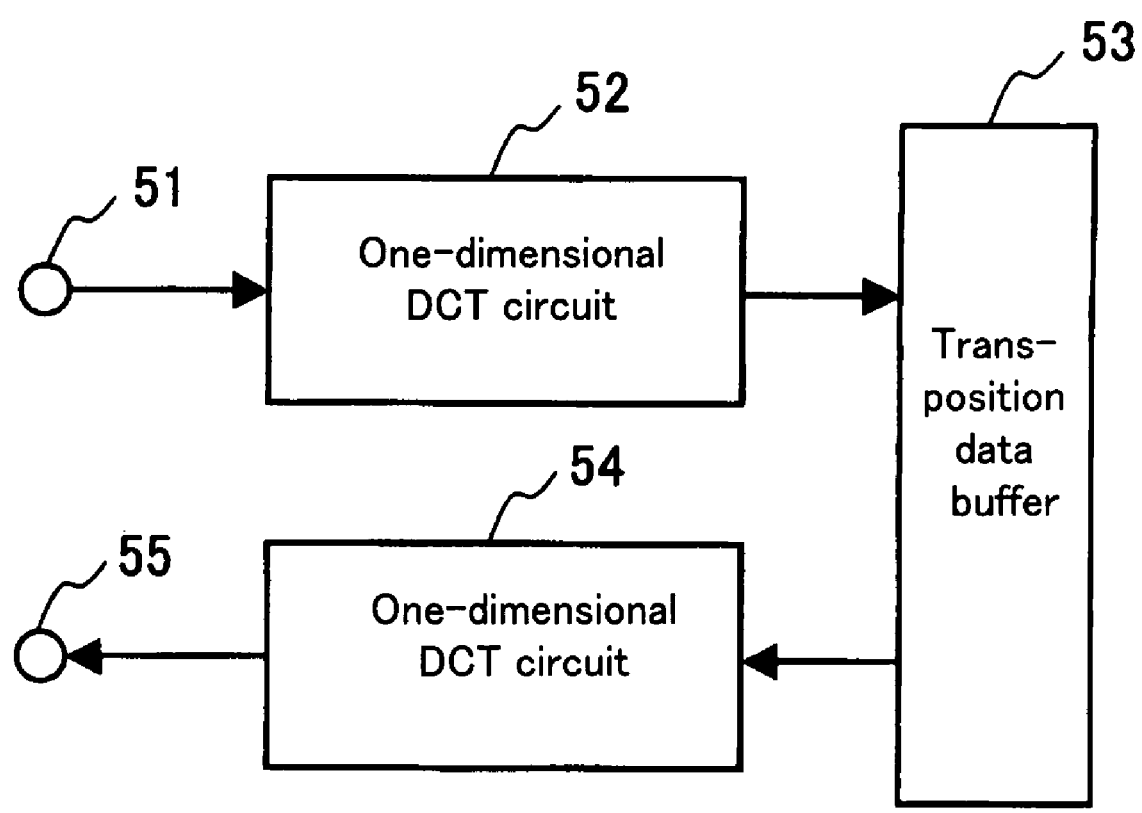

ORTHOGONAL TRANSFORMATION APPARATUS AND IMAGING SYSTEM

BACKGROUND OF THE INVENTION

1. Field of the Invention

The present invention relates to an orthogonal transformation apparatus and an orthogonal transformation method that achieve two-dimensional orthogonal transformation performed by a block unit of m×n pixels (m and n are natural numbers: m=n, or m≠n) such as 8×8 pixels through breaking it down to one-dimensional orthogonal transformation of a row direction and of a column direction. Further, the present invention relates to an imaging system.

2. Description of the Related Art

Orthogonal transformation processing is the processing for transforming a signal on the spatial axis into a signal on the frequency axis. Particularly, discrete cosine transform (DCT) as a way of orthogonal transformation is employed in JPEG (Joint Photographic Experts Group) and MPEG (Moving Picture Experts Group) which are the typical compression techniques of pixels data, and it has been served widely as a technique capable of transferring data with small amount of information, in accordance with diffusion of digital cameras and digital video cameras, and developments in the digital communication technique.

FIG. 14 shows the structure of a typical image compression apparatus. The orthogonal transformation processing will be described hereinafter referring to this drawing. A DCT circuit 31 for performing discrete cosine transformation generates DCT coefficients by performing frequency transformation of pixel data that is inputted sequentially through being divided into blocks of 8×8 pieces in advance. Color change in a natural image is smooth in most cases. When frequency transformation is performed, large-valued DCT coefficients become concentrated in a low-frequency area m shown in FIG. 15, and small-valued DCT coefficients are distributed in a high-frequency area n. Then, a quantizer 32 generates quantization coefficients through dividing the above-described DCT coefficients by a quantization value that is set in advance. This processing allows "0" coefficient to be concentrated in the high-frequency area which does not influence the picture quality. Further, a variable-length encoder 33 generates run-length data by combining RUN that shows number of "0" in order of zigzag scan and LEVEL that shows magnitude of a coefficient value. Further, the variable-length encoder 33 reduces the data volume by allocating different length of code words in accordance with the appearance rate of the above-described combination.

Meanwhile, as shown in FIG. 16, an image expansion apparatus for decoding variable-length encoded data that is encoded by the above-described structure comprises a variable-length decoder 34, an inverse quantizer 35 and an inverse DCT circuit 36 in accord with the image compression apparatus described above. The variable-length decoder 34 decodes the inputted variable-length encoded data as a combination of RUN that indicates the number of "0" and LEVEL that indicates the magnitude of the coefficient values to generate "0" coefficients by the magnitude of RUN, and combines the "0" coefficients with the coefficient indicated by LEVEL. This operation is repeated until the coefficients by the 8×8 pixels are generated. The inverse quantizer 35 generates inverse-quantization DCT coefficients by multiplying the generated coefficients corresponding to the 8×8 pixels by a quantization value that is set in advance. Further, the inverse DCT circuit 36 decodes the encoded variable-length encoded data into pixel data by transforming the generated inverse quantization coefficient from the frequency area to the spatial area.

Next, FIG. 17 shows the structure of a typical encoder for moving picture. Hereinafter, the moving picture encoder will be described referring to this drawing. As a moving picture compression method, MPEG that is standardized by ISO (International Organization for Standardization) is known in general. MPEG performs encoding by utilizing intra-frame correlation or encoding by utilizing inter-frame correlation by each block of a screen (frame). A frame constituted by using only the intra-frame correlation is called an I (intra) picture, and a frame constituted under mixture of intra-frame correlation and inter-frame correlation is called a P (predictive) picture and a B (bidirectionally predictive) picture. For the I pictures, compression processing that is the same as the typical processing is performed. Thus, a part of the explanation thereof will be omitted below.

An output of the quantizer 32 is also inputted to the inverse quantizer 35, and it is sent thereafter to a reconstitution image generator 40 through the inverse DCT circuit 36. At the same time, an output (compensated result) of a motion compensator 42 is also inputted to the reconstitution image generator 40. When the output of the quantizer 32 is an output generated based on the block of the inter-frame correlation, both of the input data are added, and the result thereof is written to a frame memory 41. Meanwhile, since the I picture is constituted only with the intra-frame correlation, the output of the motion compensator 42 is not inputted to the reconstitution image generator 40. Therefore, the data transmitted from the inverse DCT circuit 36 is written as it is to the frame memory 41. Image data sent to the frame memory 41 in the manner described above is called a reconstituted image, and this reconstituted image is used as a reference image in generating a P picture or a B picture.

Next, a procedure for encoding the P picture will be described. Image data of a block unit (hereinafter, referred to as input image data (block)) is inputted from an input device 37, and it is sent to a differentiator 38 and a motion detector 43. The motion detector 43 reads out an pixel data group (hereinafter, referred to as a memory pixel data (block) group) located in the vicinity of the same spatial position as that of the input image data (block), from the frame memory 41, and performs a motion search. A motion search is performed through detecting the memory pixel data (block) that has the highest correlation with the input image data (block) from the memory pixel data (block) group. The motion detector 43 outputs the memory pixel data (block) having the highest correlation to the motion compensator 42 as a reference image. Further, the motion detector 43 outputs a motion vector, that indicates the position of the reference image, to a motion vector encoder 44. When intra-frame correlation encoding is selected, the encoding processing hereinafter is the same as that at the time of I picture. When inter-frame correlation encoding is selected, the reference image is sent to the differentiator 38 through the motion compensator 42. The differentiator 38 calculates a difference between the input image data (block) and the reference image, and outputs it to the DCT circuit 31. The variable-length encoder 33 encodes the quantized image data, and outputs the encoded data along with the data encoded by the motion vector encoder 44. FIG. 18 is a block diagram showing the structure of a typical image decoder that corresponds to the moving picture encoder shown in FIG. 17.

Hereinafter, a conventional two-dimensional discrete cosine transformation apparatus will be described. The two-dimensional DCT used for image processing is generally processed based on a unit of 8×8 pixels, and it is expressed by expression (1). It can be seen that one-dimensional DCT expressed by expression (2) is repeatedly executed in expression (1) in row and column directions. Thus, DCT may be performed by: executing one-dimensional DCT in the row direction; transposing the obtained result to commute the row and the column; executing the same one-dimensional DCT in the column direction; and return the row and the column to the original state in the obtained result. Further, inverse DCT is also expressed by expression (3), and it can be seen that one-dimensional inverse DCT expressed by expression (4) is repeatedly executed in the row and column directions. The inverse DCT can be achieved in the same manner as that of DCT.

$$F(u, v) = \frac{1}{4} CuCv \sum_{x=0}^{7} \sum_{y=0}^{7} f(x, y) \cos \frac{(2x+1)u\pi}{16} \cos \frac{(2y+1)v\pi}{16} \quad \text{[Expression 1]}$$

$$F(u) = Cu \sum_{x=0}^{7} f(x) \cos \frac{(2x+1)u\pi}{16} \quad \text{[Expression 2]}$$

$$f(x, y) = \frac{1}{4} \sum_{u=0}^{7} \sum_{v=0}^{7} CuCvF(u, v) \cos \frac{(2x+1)u\pi}{16} \cos \frac{(2y+1)v\pi}{16} \quad \text{[Expression 3]}$$

$$f(x) = \sum_{u=0}^{7} CuF(u) \cos \frac{(2x+1)u\pi}{16} \quad \text{[Expression 4]}$$

As the conventional DCT that performs the processing based on a block unit of 8×8 pixels, there is a discrete cosine transformation device disclosed in Japanese Published Patent Literature (Japanese Unexamined Patent Publication H5-153403). One of the examples will be described referring to FIG. 19. A one-dimensional DCT circuit 52 performs one-dimensional DCT by a unit of 8 pixels in one row on the image data that is inputted successively in the row direction from an input device 51. The result thereof is outputted to a transposition data buffer 53 and stored therein. After repeating the above-described operation by eight rows, the data is read out in the row direction from the transposition data buffer 53, and the readout data is outputted to a one-dimensional DCT circuit 54. The one-dimensional DCT circuit 54 performs one-dimensional DCT processing by a unit of 8 pixels in one column, and the processed result is outputted to an output device 55.

However, it is difficult to achieve more speeding-up in the structure of the conventional technique described above. That is, the power consumption is increased when the operation is sped up. Further, a plurality of memory devices (transposition data buffers) is also required when a plurality of DCT circuits is provided in parallel, which expands the circuit scale.

SUMMARY OF THE INVENTION

The main object of the present invention therefore is to provide an orthogonal transformation apparatus and an orthogonal transformation method, which can reduce the number of memory devices and perform operations at much higher speed.

(1) The orthogonal transformation apparatus according to the present invention is an orthogonal transformation apparatus which executes two-dimensional orthogonal transformation of pixel data by a block unit of m×n pixels (m and n are natural numbers: m=n, or m≠n) through breaking down the two-dimensional orthogonal transformation into one-dimensional orthogonal transformation of a row direction and a column direction. The orthogonal transformation apparatus comprises:

an input device to which the pixel data of one block is inputted sequentially;

a one-dimensional orthogonal transformation device group constituted with a plurality of one-dimensional orthogonal transformation devices which perform one-dimensional orthogonal transformation of the pixel data;

a memory device for storing one-dimensional orthogonal transformation data of one block; and a selector which selects either the pixel data that is inputted via the input device or the one-dimensional orthogonal transformation data that is stored in the memory device, and outputs the selected data to the one-dimensional orthogonal transformation devices, wherein the one-dimensional orthogonal transformation devices: generate the one-dimensional orthogonal transformation data by performing first one-dimensional orthogonal transformation processing simultaneously to a plurality of rows of m-pixels of the pixel data when the pixel data is inputted via the selector, and store the one-dimensional orthogonal transformation data to the memory device; and generate two-dimensional orthogonal transformation data by performing second one-dimensional orthogonal transformation processing to the one-dimensional orthogonal transformation data on a plurality of columns of the n-pixels when the one-dimensional orthogonal transformation data on the plurality of columns of the n-pixels that are stored in the memory device is inputted sequentially via the selector. For this structure, FIG. 1 showing an embodiment that is described later can be referred.

In this structure, the pixel data from the input device is inputted to the plurality of one-dimensional orthogonal transformation devices via the selector. The plural one-dimensional orthogonal transformation devices perform the first one-dimensional orthogonal transformation to a plurality of rows simultaneously, and the one-dimensional orthogonal transformation data obtained thereby is written to the memory device. Further, a plurality of columns of the one-dimensional orthogonal transformation data is read from the memory device in a direction that is orthogonal to the writing direction of the data, and the readout data is inputted again to the plural one-dimensional orthogonal transformation devices via the selector. There, the second one-dimensional orthogonal transformation (that is, the two-dimensional orthogonal transformation) is completed in the one-dimensional orthogonal transformation data, and the two-dimensional orthogonal transformation data is outputted from the output device.

The technical feature here is in a point that the plural one-dimensional orthogonal transformation devices are used for the first one-dimensional orthogonal transformation as well as the second one-dimensional orthogonal transformation. After simultaneously performing one-dimensional orthogonal transformation on a plurality of rows of pixel data in the first one-dimensional orthogonal transformation, the transformation data is stored respectively in the corresponding rows of the same memory device. Then, one-dimensional orthogonal transformation (as a result, serves as two-dimensional orthogonal transformation) is performed simultaneously on the one-dimensional orthogonal transformation data of a plurality of columns that are read out from the memory device by switching the directions, in the second one-dimensional orthogonal transformation. Therefore, it is possible to achieve high-speed two-dimensional orthogonal transformation with the minimum required number of memory devices.

(2) In the structure of (1) described above, there is such an embodiment that the orthogonal transformation apparatus of clock-restriction type further comprises an information input device for inputting information that shows a characteristic of pixel data inputted from the input device; and a clock controller for controlling clocks supplied to the plural one-dimensional orthogonal transformation devices, wherein;

the selector switches the one-dimensional orthogonal transformation devices as an output destination based on the information that is inputted to the information input device; and the clock controller supplies a clock only to the one-dimensional orthogonal transformation device that is selected by the selector. For this structure, FIG. 2 in an embodiment that is described later can be referred.

According to this structure, since supply of the clock to the one-dimensional orthogonal transformation devices is restricted, two-dimensional orthogonal transformation with low power consumption can be achieved. For example, it becomes possible to suppress the power consumption by restricting the use of the one-dimensional orthogonal transformation devices based on the information such as the resolution of the image or the frame rate of the moving picture.

(3) In the structure of (1) described above, there is such an embodiment that the orthogonal transformation apparatus, that is a type of a parallel execution on the plural blocks, comprises a plurality of the selectors and a plurality of aid second one-dimensional orthogonal transformation device groups, wherein in each of the one-dimensional orthogonal transformation device groups, processing for executing one-dimensional orthogonal transformation on the pixel data that is inputted via the input device and processing for executing one-dimensional orthogonal transformation on the one-dimensional orthogonal transformation data that is stored in the memory device is executed in parallel alternately. In this structure, the input device is used in common for the first selector and the second selector. Among the block groups inputted from the input device, the first selector and the first one-dimensional orthogonal transformation devices are used for the odd-numbered blocks, and the second selector and the second one-dimensional orthogonal transformation devices are used for the even-numbered blocks. For this structure, FIG. 5 in an embodiment that is described later can be referred.

If it is constituted like this, the one-dimensional orthogonal transformation on the even-numbered block executed by the second one-dimensional orthogonal transformation device simultaneously on a plurality of rows and the one-dimensional orthogonal transformation on the odd-number block right before executed by the first one-dimensional orthogonal transformation device simultaneously on a plurality of columns are performed simultaneously in parallel. Further, the one-dimensional orthogonal transformation (generation of two-dimensional orthogonal transformation data) on the even-numbered block executed by the second one-dimensional orthogonal transformation device simultaneously on a plurality of columns and the one-dimensional orthogonal transformation (generation of two-dimensional orthogonal transformation data) on the odd-number block right after executed by the first one-dimensional orthogonal transformation device simultaneously on a plurality of rows are performed simultaneously in parallel. Therefore, the speed of the processing can be improved further. Since the memory device is used in common for the first one-dimensional orthogonal transformation device and the second one-dimensional orthogonal transformation device, the writing direction to the memory device of the one-dimensional orthogonal transformation data obtained by the one-dimensional orthogonal transformation performed simultaneously on a plurality of rows in the even-numbered block becomes the column direction converted by 90 degrees in order to perform the parallel processing simultaneously. The readout direction of the one-dimensional orthogonal transformation data of the even-numbered block from the memory device becomes the row direction.

(4) In the structure of (1) described above, there is such an embodiment that the one-dimensional orthogonal transformation device group comprises a first one-dimensional orthogonal transformation device group constituted with a plurality of the one-dimensional orthogonal transformation devices which perform one-dimensional orthogonal transformation to the pixel data, and a second one-dimensional orthogonal transformation device group constituted with a plurality of the one-dimensional orthogonal transformation devices which generate second one-dimensional orthogonal transformation data by executing second one-dimensional orthogonal transformation processing to the one-dimensional orthogonal transformation data corresponding to a plurality of columns of the n-pixels that are stored in the memory device; and the selector is omitted. With respect to this structure, FIG. 6 in an embodiment that is described later can be referred According to this structure, the first one-dimensional orthogonal transformation devices perform one-dimensional orthogonal transformation simultaneously to the plurality of rows, and the second one-dimensional orthogonal transformation devices perform one-dimensional orthogonal transformation simultaneously to the plurality of columns. Therefore, the selector can be omitted.

(5) In the structure of (1) described above, there is such an embodiment that:

the input device includes a first input device to which the pixel data of one block is inputted sequentially, and a second input device to which pixel data of another block different from that of the first input device is inputted sequentially;

the selector includes a first selector which selects either the pixel data that is inputted via the first input device or the one-dimensional orthogonal transformation data that is stored in the memory device, and a second selector which selects either the pixel data that is inputted via the second input device or the one-dimensional orthogonal transformation data that is stored in the memory device;

the one-dimensional orthogonal transformation device group comprises a first one-dimensional orthogonal transformation group and a second one-dimensional orthogonal transformation group;

the one-dimensional orthogonal transformation devices constituting the first one-dimensional orthogonal transformation device group: generate the one-dimensional orthogonal transformation data by performing first one-dimensional orthogonal transformation processing simultaneously to a plurality of rows of m-pixels of the pixel data when the pixel data is inputted via the first selector, and stores the one-dimensional orthogonal transformation data to the memory device; and generate two-dimensional orthogonal transformation data by performing second one-dimensional orthogonal transformation processing to the one-dimensional orthogonal transformation data corresponding to a plurality of columns of the n-pixels when the one-dimensional orthogonal transformation data corresponding to the plurality of columns of the n-pixels that are stored in the memory device is inputted sequentially via the first selector; and the one-dimensional orthogonal transformation devices constituting the second one-dimensional orthogonal transformation device group: generate the one-dimensional orthogonal transformation data by performing first one-dimensional orthogonal transformation processing simultaneously to a plurality of rows of m-pixels of the pixel data when the pixel data is inputted via the second selector, and store the one-dimensional orthogonal transformation data to the memory device; and generate two-dimensional orthogonal transformation data by performing second one-dimensional orthogonal transformation processing to the one-dimensional orthogonal transformation data on a plurality of columns of the n-pixels when the one-dimensional orthogonal transformation data corresponding to the plurality of columns of the n-pixels that are stored in the memory device is inputted sequentially via the second selector. The technical feature here is in a point that two input devices are provided, namely the first input device and the second input device. The memory device is used in common for the first one-dimensional orthogonal transformation device and the second one-dimensional orthogonal transformation device. This corresponds to such a case where two orthogonal transformation devices of (1) are arranged in parallel, and a memory device is used in common. For this structure, FIG. 7 in an embodiment that is described later can be referred.

Since the memory device is also used here in common for the first one-dimensional orthogonal transformation device and the second one-dimensional orthogonal transformation device, the writing direction to the memory device of the one-dimensional orthogonal transformation data, that is obtained by the one-dimensional orthogonal transformation performed simultaneously to a plurality of rows in the even-numbered block, becomes the column direction converted by 90 degrees in order to perform the parallel processing simultaneously. The readout direction of the one-dimensional orthogonal transformation data of the even-numbered block from the memory device becomes the row direction. According to such structure, it becomes possible to perform two-dimensional orthogonal transformation to the pixel data of two different blocks simultaneously by using the minimum required number of memory device.

(6) In the structure of (5) described above, there is such an embodiment that the orthogonal transformation apparatus further comprises:

an operation mode input device to which an operation mode of the apparatus is inputted; and a controller for controlling operations in each of the first selector and the second selector, the first one-dimensional orthogonal transformation device and the second one-dimensional orthogonal transformation device based on the operation mode, wherein the controller inputs data inputted via either one or both of the first selector and the second selector to the first one-dimensional orthogonal transformation device and the second one-dimensional orthogonal transformation device based on the operation mode.

For this structure, FIG. 10 in an embodiment that is described later can be referred. This structure enables the plurality of one-dimensional orthogonal transformation devices to be used only for one of the data. Therefore, more faster processing can be achieved.

(7) In the structure of (6) described above, there is such an embodiment that the memory device includes a first memory device and a second memory device for storing the one-dimensional orthogonal transformation data of one block respectively, wherein the pixel data inputted via the first input device is stored in the first memory device, and the pixel data inputted via the second input device is stored in the second memory device. For this structure, FIG. 11 in an embodiment that is described later can be referred. There are two memory devices in this structure, so that the pixel data of two different blocks can be processed asynchronously and individually. Therefore, high-speed two-dimensional orthogonal transformation can be achieved.

(8) In the structure of (1) described above, there is such an embodiment that the first one-dimensional orthogonal transformation device is a discrete cosine transformation device or a Hadamard transformation device.

(9) In the structure of (1) described above, there is such an embodiment that the first one-dimensional orthogonal transformation device performs processing including inverse discrete cosine transformation processing or inverse Hadamard transformation processing. Herewith, moving picture processing can be performed.

(10) The orthogonal transformation method according to the present invention is an orthogonal transformation method which executes two-dimensional orthogonal transformation of pixel data by a block unit of m×n pixels (m and n are natural numbers: m=n, or m≠n) through breaking down the two-dimensional orthogonal transformation into one-dimensional orthogonal transformation of a row direction and a column direction. The orthogonal transformation method comprises:

a step for accepting an input of the pixel data of one block sequentially;

a step for generating one-dimensional orthogonal transformation data through simultaneously executing first one-dimensional orthogonal transformation processing to the pixel data corresponding to a plurality of rows of m-pixels by using a plurality of one-dimensional orthogonal transformation devices;

a step for storing the one-dimensional orthogonal transformation data corresponding to the plurality of rows by using a memory device that is used for storing the one-dimensional orthogonal transformation data of one block; and a step for reading out the one-dimensional orthogonal transformation data corresponding to a plurality of columns of n-pixels from the memory device, and generating two-dimensional orthogonal transformation data by simultaneously performing second one-dimensional orthogonal transformation processing to each of the readout one-dimensional transformation data by using the plural one-dimensional orthogonal transformation devices.

In this orthogonal transformation method, upon completing the first one-dimensional orthogonal transformation corresponding to the one block of pixel data by repeating the one-dimensional orthogonal transformation to a plurality of rows and temporal storage of data, the one-dimensional orthogonal transformation data of a plurality of columns is read out successively from the memory device to perform the two-dimensional orthogonal transformation (that is, the second one-dimensional orthogonal transformation) to them. Then, the obtained two-dimensional orthogonal transformation data is outputted. In this method, a single memory device is used in common for the first one-dimensional orthogonal transformation of the row direction and the second one-dimensional orthogonal transformation of the column direction so as to execute the first one-dimensional orthogonal transformation in the row direction simultaneously to a plurality of rows and execute the second one-dimensional orthogonal transformation in the column direction simultaneously to a plurality of columns. Therefore, it is possible to achieve high-speed two-dimensional orthogonal transformation with the minimum required number of memory device.

(11) In the structure of (10) described above, there is such an embodiment that the orthogonal transformation method further comprises:
 a step for accepting information that shows a characteristic of the pixel data to be inputted; and
 a step for restricting operations of the one-dimensional orthogonal transformation devices based on the information to be inputted.

(12) In the structure of (11) described above, there is such an embodiment that in the step of restricting the operations of the one-dimensional orthogonal transformation devices, a clock supply to the one-dimensional orthogonal transformation devices that are controlled to be inactive is stopped.

(13) In the structure of (11) described above, there is such an embodiment that the information showing the characteristic of the inputted pixel data is a resolution of an image to be inputted.

(14) In the structure of (11) described above, there is such an embodiment that the information showing the characteristic of the inputted pixel data is a frame rate of a moving picture to be inputted. Herewith, it is possible to reduce the power consumption by switching the output destination of the selector in accordance with the size of the image to be processed or the frame rate of the moving picture to be processed so as to restrict the number of the one-dimensional orthogonal transformation device to be used and halt the one-dimensional orthogonal transformation device that is not being used.

(15) In the structure of (10) described above, there is such an embodiment that two-dimensional orthogonal transformation step is constituted with a first one-dimensional orthogonal transformation step performed to a plurality of rows of the m-pixels and a second one-dimensional orthogonal transformation step performed to a plurality of columns of the n-pixels; and
 two of the two-dimensional orthogonal transformation steps are included, wherein
 in the two two-dimensional orthogonal transformation steps, the one-dimensional orthogonal transformation processing performed to the pixel data of the two blocks that are inputted sequentially is executed in parallel alternately with a time lag.

(16) In the structure of (15) described above, there is such an embodiment that: in one of the two-dimensional orthogonal transformation steps, the two-dimensional orthogonal transformation step is performed to the pixel data that is accepted in the first one-dimensional orthogonal transformation processing; and in the other of the two-dimensional orthogonal transformation steps, the two-dimensional orthogonal transformation step is performed to the one-dimensional orthogonal transformation data that is stored in the memory device.

According to this structure, with respect to the pixel data of two different blocks, the first one-dimensional orthogonal transformation to a plurality of rows is performed in parallel with a time lag and the second one-dimensional orthogonal transformation to a plurality of columns is performed in parallel with a time lag as well. When the one-dimensional orthogonal transformation data in the column direction of the odd-numbered block is read out from the memory device, the one-dimensional orthogonal transformation data in the row direction of the even-numbered block is simultaneously stored to the memory device in the column direction. Further, when the one-dimensional orthogonal transformation data in the row direction of the even-numbered block is read out from the memory device, the one-dimensional orthogonal transformation data in the row direction of the next odd-numbered block is simultaneously stored to the memory device in the row direction. By doing so, orthogonal transformation of two different blocks can be performed in parallel.

(17) In the structure of (10) described above, there is such an embodiment that: two steps are executed in parallel in all the steps described above;
 the second one-dimensional orthogonal transformation processing performed to the one-dimensional orthogonal transformation data that is read out from an odd-numbered block of the memory device and the first one-dimensional orthogonal transformation processing performed to the pixel data accepted in an even-numbered block are simultaneously executed in parallel; and
 the second one-dimensional orthogonal transformation processing performed to the one-dimensional orthogonal transformation data that is read out from an even-numbered block of the memory device and the first one-dimensional orthogonal transformation processing performed to the pixel data accepted in an odd-numbered block are simultaneously executed in parallel. Herewith, it is possible to perform two-dimensional orthogonal transformation to the pixel data of two different blocks with the minimum required number of memory device.

(18) In the structure of (17) described above, there is such an embodiment that in each of the one-dimensional orthogonal transformation processing, either one or both of the pixel data in the odd-numbered block and the pixel data in the even-numbered block is processed in accordance with an operation mode of an apparatus that executes two-dimensional orthogonal transformation. Herewith, it is possible to use the plurality of one-dimensional orthogonal transformation devices only for one of the data. Therefore, further speeding-up of the processing can be achieved.

(19) In the structure of (17) described above, there is such an embodiment that a first memory device and a second memory device which store the one-dimensional orthogonal transformation data of one block respectively are used as memory devices; and
 the one-dimensional orthogonal transformation data of the odd-numbered block is stored in the first memory device, and the one-dimensional orthogonal transformation data of the even-numbered block is stored in the second memory device.

(20) In the structure of (19) described above, there is such an embodiment that in each of the one-dimensional orthogonal transformation processing, either one or both of the pixel data in the odd-numbered block and the pixel data in the even-numbered block is processed in accordance with an operation mode of an apparatus that executes two-dimensional orthogonal transformation; and
 when either one is processed, processing thereof is performed with the first memory device, and the second memory device is halted.

(21) In the structure of (10) described above, there is such an embodiment that the first one-dimensional orthogonal transformation step performs discrete cosine transformation processing or Hadamard transformation processing.

(22) In the structure of (10) described above, there is such an embodiment that processing including inverse discrete cosine transformation processing or inverse Hadamard transformation processing is executed in the first one-dimensional orthogonal transformation step.

(23) It is possible to constitute an imaging system which comprises:

an image processing circuit that includes the orthogonal transformation apparatus of claim 1 for performing image processing;

an image sensor which outputs an image signal to the image processing circuit; and an optical system which forms an image focus of light on the image sensor.

(24) In the structure of (23) described above, there is such an embodiment that the imaging system further comprises a converter which converts the image signal obtained from the image sensor into a digital signal, and supplies the digital signal to the image processing circuit.

According to the present invention, writing processing is performed in parallel with readout processing of the one-dimensional orthogonal transformation data that is stored in the memory device. Thus, high-speed two-dimensional orthogonal transformation can be achieved with the minimum required capacity.

As has been described above, the orthogonal transformation apparatus and the orthogonal transformation method of the present invention can be achieved with the minimum required memory capacity by storing a plural one-dimensional orthogonal transformation data in the same memory device simultaneously.

Furthermore, orthogonal transformation and inverse orthogonal transformation can be achieved simultaneously in the present invention, so that it can be applied to a high-speed compression/expansion system and the like for processing moving pictures. The present invention is also useful for a portable telephone with a camera, DSC and the like to which the moving picture encoding/decoding technique is loaded.

BRIEF DESCRIPTION OF THE DRAWINGS

Other objects of the present invention will become clear from the following description of the preferred embodiments and the appended claims. Those skilled in the art will appreciate that there are many other advantages of the present invention by embodying the present invention.

FIG. 1 is a block diagram showing the structure of a two-dimensional DCT device according to a first embodiment of the present invention;

FIG. 4 is a block diagram showing the structure of the two-dimensional DCT device (with a clock controller) according to the first embodiment of the present invention;

FIG. 5 is a block diagram showing the structure of the two-dimensional DCT device (with second one-dimensional DCT circuits) according to the first embodiment of the present invention;

FIG. 7 is a block diagram showing the structure of a two-dimensional DCT device according to a second embodiment of the present invention;

FIG. 11 is a block diagram showing the structure of the two-dimensional DCT device (with a second memory device) according to the second embodiment of the present invention;

FIG. 17 is a block diagram showing the structure of a typical moving picture encoder;

FIG. 19 is a block diagram showing the structure of a two-dimensional DCT device according to a conventional technique.

DETAILED DESCRIPTION OF THE INVENTION

Figure 2:
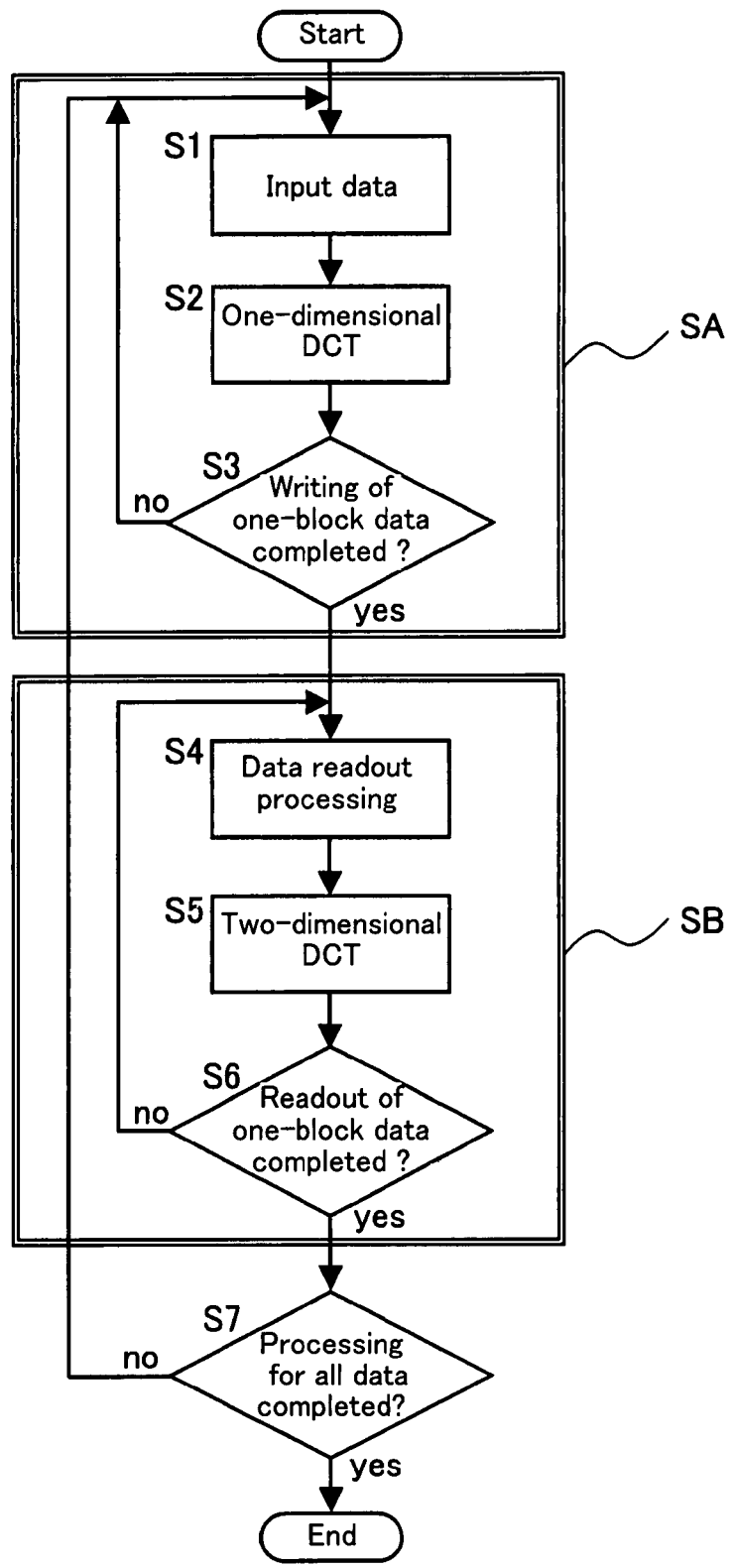
FIG. 2 is a flowchart showing the operation of the two-dimensional DCT device according to the first embodiment of the present invention.
Figure 3A:
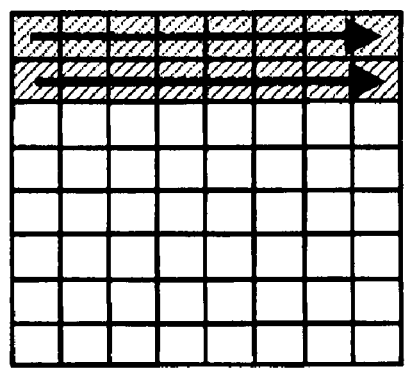
FIGS. 3A-3D are illustrations showing the operation transitions of a memory device of the two-dimensional DCT device according to the first embodiment of the present invention.
Figure 3B:
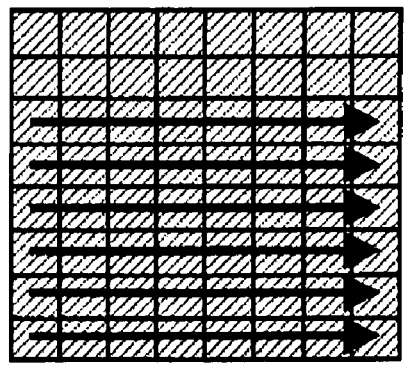
Figure 3C:
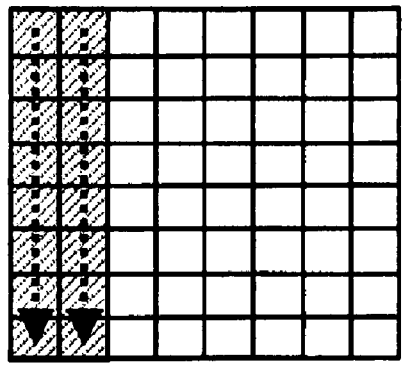
Figure 3D:
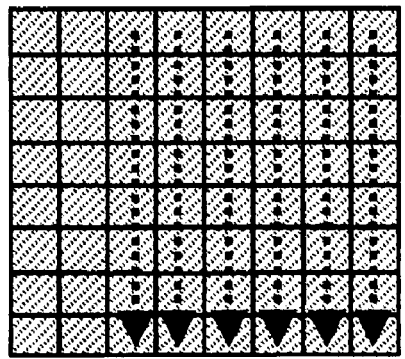

Hereinafter, embodiments of an orthogonal transformation apparatus according to the present invention will be described in detail referring to the accompanying drawings. Explanations are provided hereinafter referring to the case of DCT (discrete cosine transformation), however, it is needless to say that the other orthogonal transformations can be employed as well.

First Embodiment

FIG. 1 shows a schematic structure of a two-dimensional DCT device according to a first embodiment of the present invention. This embodiment will be described referring to the case where one block has 8×8 pieces of pixel data, and two one-dimensional DCT circuits are provided. In FIG. 1, reference numeral 1 is an input device for inputting data of 8×8 pieces, M is a memory device for storing one-dimensional DCT data of 8×8 pieces, 2 is a selector for selecting the input data that is inputted to the input device 1 and the one-dimensional DCT data that is stored in the memory device M, 3 is a one-dimensional DCT circuit which performs one-dimensional DCT processing to the data that is supplied via the selector 2, and 4 is an output device which outputs two-dimensional DCT data that has received one-dimensional DCT processing in the one-dimensional DCT circuit 3.

Two one-dimensional DCT circuits 3 are arranged in parallel between the selector 2 and the output device 4, and one-dimensional DCT processing is performed simultaneously to the one-dimensional DCT data of two rows supplied via the selector 2 by those two one-dimensional DCT circuits 3. When the selector 1 selects the output of the input device 1, the one-dimensional DCT circuits 3 simultaneously perform one-dimensional DCT processing to the one-dimensional data of two rows in the row direction among one block data of 8×8 pieces. Meanwhile, when the selector 2 selects the output of the memory device M, the one-dimensional DCT circuits 3 simultaneously perform one-dimensional DCT processing to the one-dimensional data of two columns in the column direction among one block data of 8×8 pieces. The flow of the one-dimensional DCT data is as follows. That is, the input device 1→the first selector 2→the one-dimensional DCT circuits 3→the memory device M→the selector 2→the one-dimensional DCT circuits 3 (as a result, two-dimensional DCT processing is performed)→the output device 4.

FIG. 2 is a flowchart of the processing performed by the two-dimensional DCT device according to the first embodiment. FIGS. 3A-3D are illustrations showing the writing and reading operations of the memory device M in the two-dimensional DCT device of the first embodiment. While referring to FIGS. 3A-3D, the flow of the processing according to the embodiment will be described based on FIG. 2.

Figure 15:
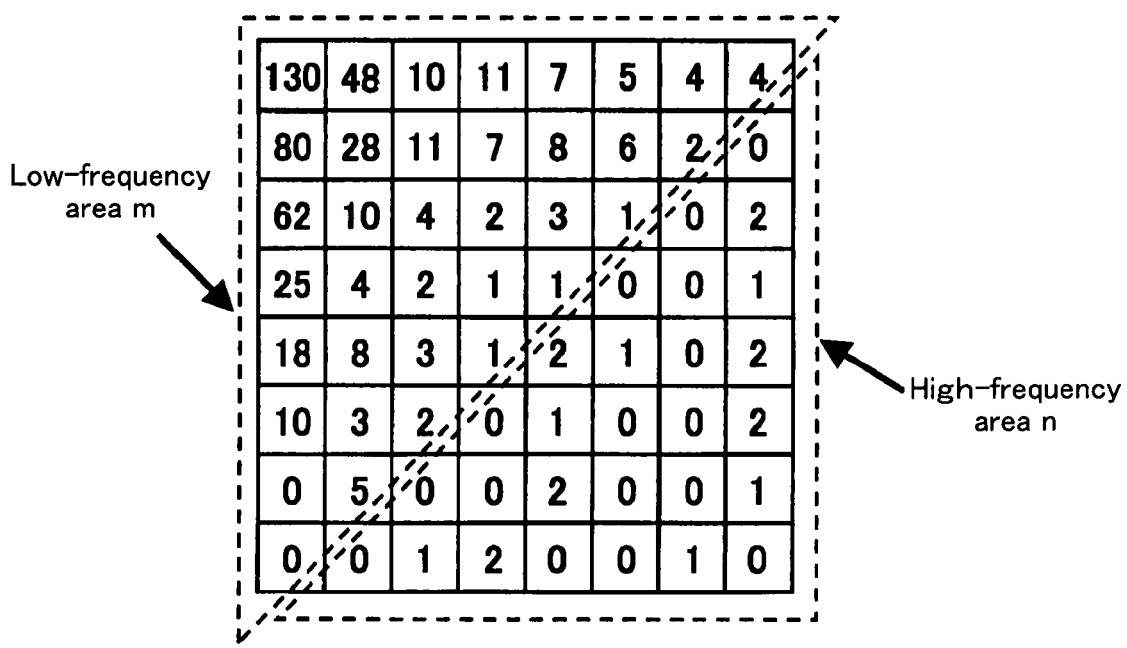
FIG. 15 is an illustration showing an example of DCT coefficients.
Figure 16:
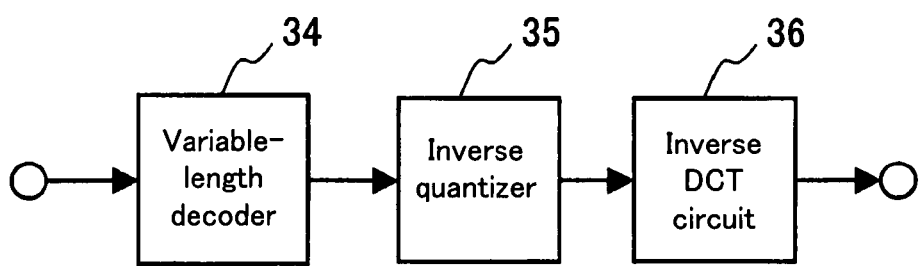
FIG. 16 is a block diagram showing the structure of a typical image decoder.
Figure 18:
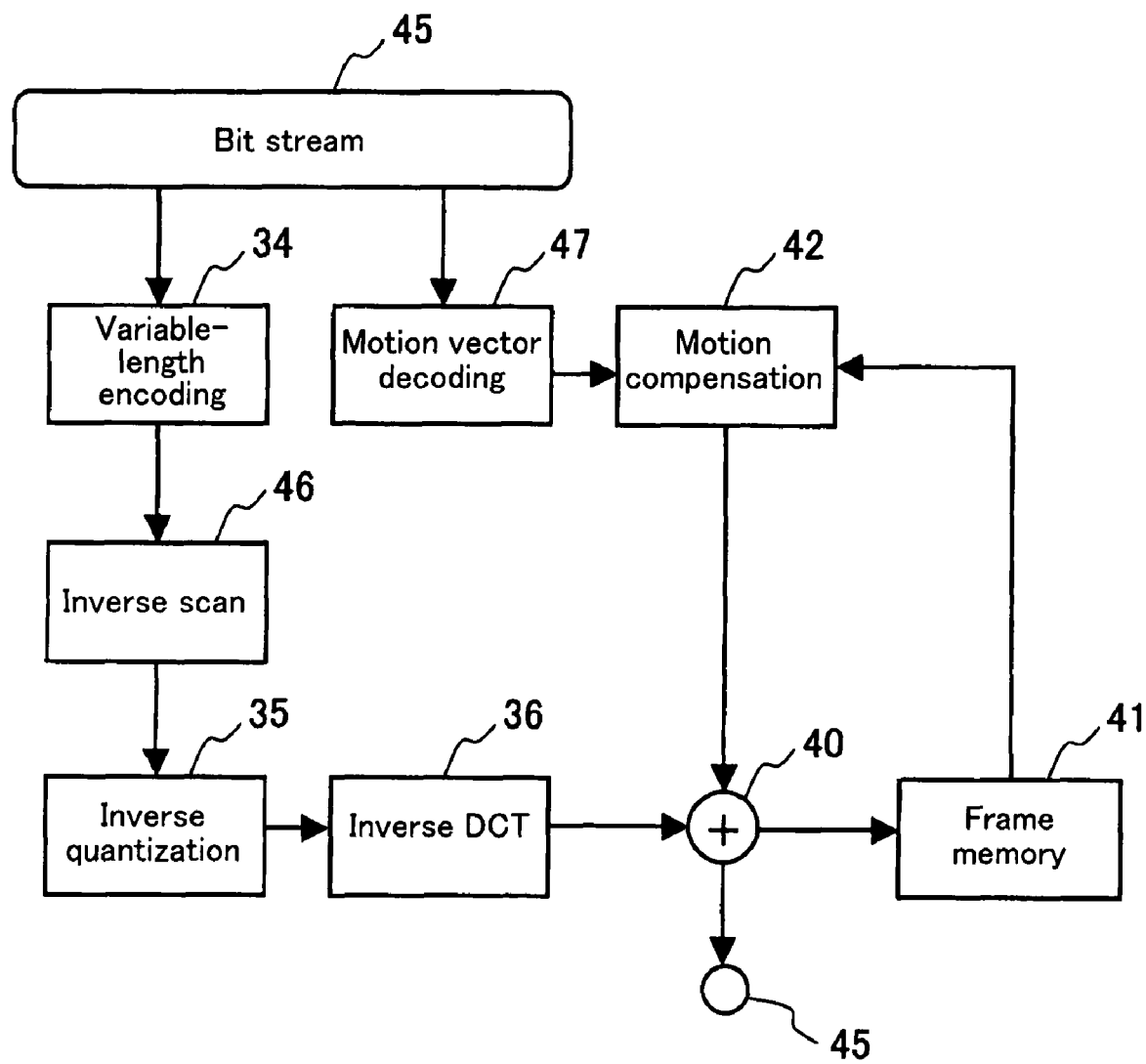
FIG. 18 is a block diagram showing the structure of a typical moving picture decoder.

First, 8×8 pieces of pixel data in one block shown in FIG. 15 are inputted from the input device 1 in two rows in the row direction (step S1), and the selector 2 outputs the pixel data to the one-dimensional DCT circuits 3. The one-dimensional DCT circuits 3 perform one-dimensional processing simultaneously to the two rows (step S2), and the processed results are stored in the memory device M (see FIG. 3A). The same operation is repeated for one block, and it is judged whether or not writing by one block has been completed (see FIG. 3B). When it is judged that it has not been completed, the procedure is returned to the step S1. When it is judged that it has been completed, the procedure is advanced to readout processing (step S3).

After completing the one-dimensional DCT processing to one block (yes in step S3), the data of two columns (see FIG. 3C) is read out from the memory device M (step S4). Then, one-dimensional processing is performed simultaneously to the read out data of two columns by the one-dimensional DCT circuits 3, and the processed results are outputted from the output device 4 (step S5). The same operation is repeated by one block, and it is judged whether or not output of the data by one block has been completed (step S6) (see FIG. 3D). When it is judged that it has been completed (yes in step S6), the procedure is returned to the step S4, and the processing to one block is completed. When judged that the above-described operation for the entire data is completed (yes in step S7), the DCT processing is ended. Meanwhile, when it is judged that the above-described operation to the entire data is not completed (no in step S7), the procedure is returned to the step S1. In FIG. 2, SA indicates the one-dimensional processing executed simultaneously to the two rows in the row direction, and SB indicates the one-dimensional processing executed simultaneously to the two columns in the column direction.

According to the embodiment constituted as described above, it is possible to perform one-dimensional DCT processing simultaneously to two rows or two columns by two one-dimensional DCT circuits 3. Thus, high-speed processing can be achieved and, at the same time, the circuit scale can be reduced since the one-dimensional DCT processing performed simultaneously to two rows can be achieved with only the minimum required number of memory device.

(Clock Control)

As shown in FIG. 4, the embodiment may further comprise an information input device 5 for inputting information (resolution of an image, frame rate of a moving picture) that shows the characteristics of the data inputted from the input device 1, and a clock controller 6 for controlling clock supply to the one-dimensional DCT circuits 3. The selector 2 switches the output destination based on the information from the information input device 5. The clock controller 6 supplies a clock only to the one-dimensional DCT circuit 3 that is selected by the selector 2 from a pair of the one-dimensional DCT circuits 3. Herewith, supply of the clock to the one-dimensional DCT circuits 3 can be restricted, so that the power consumption for two-dimensional orthogonal transformation can be reduced.

For example, in the case where the use of the one-dimensional DCT circuits 3 is restricted based on the information such as the resolution of the image or the frame rate of the moving picture or the like, it is possible to suppress the power consumption so as to achieve a low electricity.

(Two Pairs of DCT Circuits)

As shown in FIG. 5, the embodiment may further comprise a second selector 12 for selecting the input data that is supplied from the input device 1 and the one-dimensional DCT data that is supplied from the memory device M, and second one-dimensional DCT circuits 13 which performs one-dimensional DCT to the data that is supplied from the second selector 12. The first selector 2 and the first one-dimensional DCT circuits 3 take the one-dimensional data of the odd-numbered blocks as processing target, and second selector 12 and the second one-dimensional DCT circuits 13 take the one-dimensional data of the even-numbered blocks as processing target. The flow of the one-dimensional data in the case of the odd-numbered blocks becomes as follows. That is, the input device 1→the first selector 2→the first one-dimensional DCT circuits 3→the memory device M→the first selector 2→the first one-dimensional DCT circuits 3 (as a result, two-dimensional DCT processing is performed)→the output device 4. The flow of the one-dimensional data in the case of the even-numbered blocks becomes as follows. That is, the input device 1→the second selector 12→the second one-dimensional DCT circuits 13→, the memory device M→the second selector 12→the second one-dimensional DCT circuits 13 (as a result, two-dimensional DCT processing is performed)→the output device 4.

In this case, after completing the one-dimensional DCT processing (SA) shown in FIG. 2 that is executed simultaneously to two rows in the row direction in the first one-dimensional DCT circuits 3, the one-dimensional DCT processing (SA), that is executed simultaneously to two rows in the row direction of the next block, is performed at the same time in the second one-dimensional DCT circuits 13 when the one-dimensional DCT processing (SB) is executed simultaneously to two columns in the column direction. In this case, data of two columns (see FIG. 3C) is read out from the memory device M for performing the one-dimensional DCT processing (SB) simultaneously to two columns in the column direction and, at the same time, the outputs of the second one-dimensional DCT circuits 13 by the two rows of the next block are stored in the column direction. Herewith, the direction of the data is converted by 90 degrees. Therefore, the one-dimensional DCT data is held in the memory device M while the row and column thereof being superseded. The processing of the next block can be performed in parallel by executing the above-described operations through superseding the row and column by a block unit.

As just described, it is possible in the embodiment to achieve high-speed two-dimensional DCT processing through performing the processing of the next block with the second one-dimensional DCT circuits 13. In addition, such high-speed two-dimensional DCT processing can be achieved only with the minimum required number of memory device, which enables reduction of the circuit scale.

In addition, in the explanation in the embodiment described above, two one-dimensional DCT circuits are used. However, it is not intended to be limited to such case. In the embodiment described above, the first one-dimensional DCT circuits 3 and the second one-dimensional DCT circuits 13 alternately perform the one-dimensional DCT processing (SA) that is executed simultaneously to two rows in the row direction of the block and the one-dimensional DCT processing (SB) that is executed simultaneously to two columns in the column direction of the block. However, the structure shown in FIG. 6 is also useful.

Figure 6:
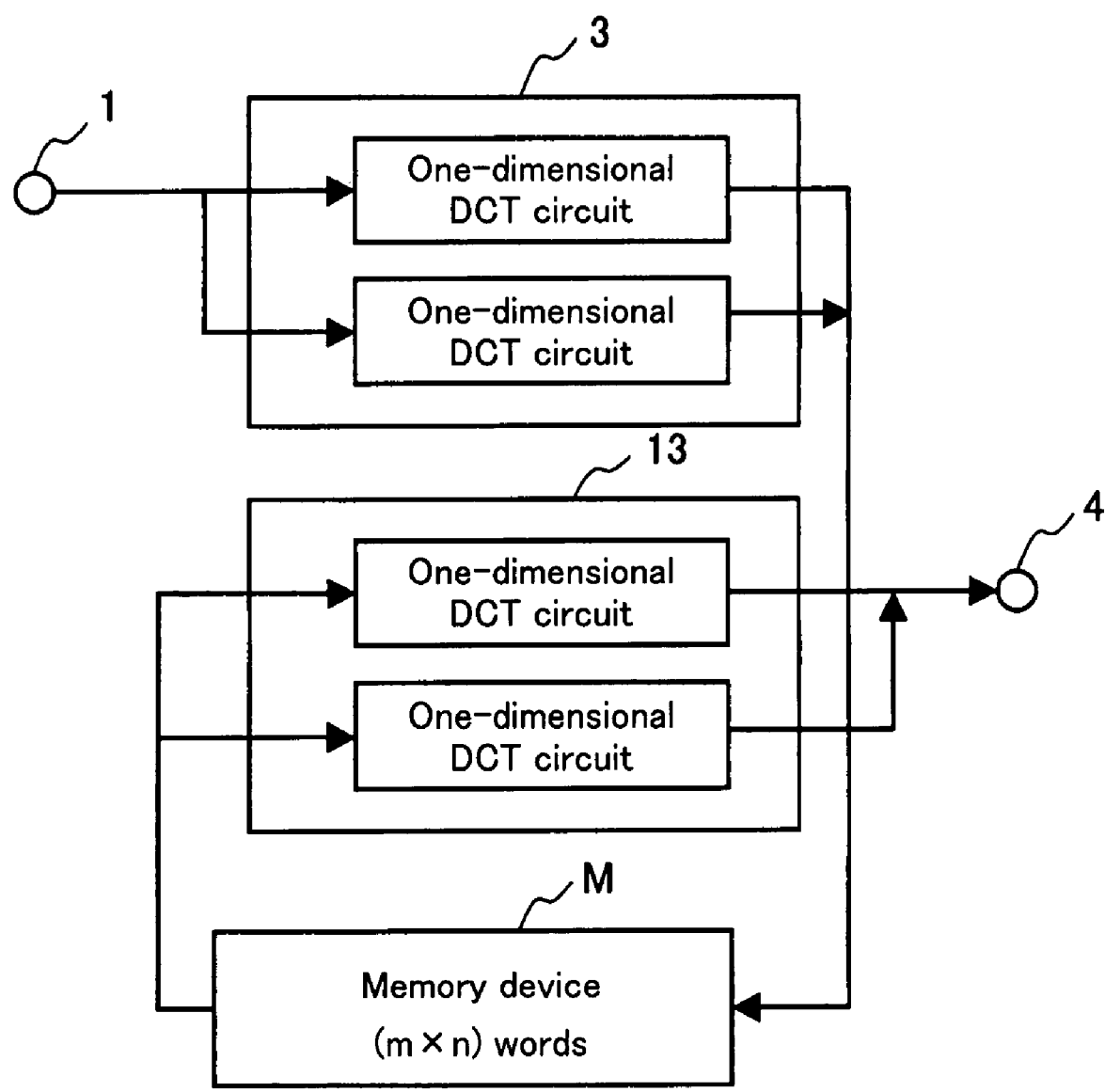
FIG. 6 is a block diagram showing the structure of the two-dimensional DCT device (without a selector) according to the first embodiment of the present invention.

In FIG. 6, the first selector 2 and the second selector 12 are omitted unlike the structure shown in FIG. 5. The flow of the one-dimensional data is as follows. That is, the input device 1→the first one-dimensional DCT circuits 3→the memory device M→the second one-dimensional DCT circuits 13 (as a result, two-dimensional DCT processing is performed)→the output device 4. The first one-dimensional DCT circuits 3 are the circuits exclusively used for executing the one-dimensional DCT processing simultaneously to two rows in the row direction, and the second one-dimensional DCT circuits 13 are the circuits exclusively used for executing the one-dimensional DCT processing simultaneously to two columns in the column direction. The first one-dimensional DCT circuits 3 perform the one-dimensional DCT processing simultaneously to two rows in the row direction of the block (SA), and the second one-dimensional DCT circuits 13 perform the one-dimensional DCT processing simultaneously to two columns in the column direction of the block (SB). While the second one-dimensional DCT circuits 13 are in the act of executing the processing in the column direction for the current block, the first one-dimensional DCT circuits 3 can execute the processing in the row direction to the next block. Therefore, it is possible to perform processing to a plurality of blocks simultaneously.

Since the first one-dimensional DCT circuits 3 entirely perform the one-dimensional DCT processing (SA) that is executed simultaneously to two rows in the row direction and the second one-dimensional DCT circuits 13 entirely perform the one-dimensional DCT processing (SB) that is executed simultaneously to two columns in the column direction, the selector 2 and the selector 12 can be omitted. Thus, the circuit scale can be more reduced compared to the structure shown in FIG. 5.

Second Embodiment

Hereinafter, a two-dimensional DCT device according to a second embodiment of the present invention will be described referring to the accompanying drawings. FIG. 7 shows the schematic structure of the two-dimensional DCT device according to the second embodiment of the present invention. For convenience sake, the same reference numerals are applied to the structures that are the same as those of the first embodiment, and a part of the explanations thereof will be omitted.

This two-dimensional DCT device comprises the following structures in addition to the structures of the two-dimensional DCT device of the first embodiment shown in FIG. 1. That is, the two-dimensional DCT device of the embodiment further comprises: a second input device 11 to which different 8×8 pieces of data as one block are inputted; a second selector 12 for selecting the input data that is inputted to the second input device 11 and the data that is stored in the memory device M; second one-dimensional DCT circuits 13 which perform one-dimensional DCT to the data that is supplied through the second selector 12; and a second output device 14 for outputting the two-dimensional DCT data to which the one-dimensional DCT processing is performed with the second one-dimensional DCT circuits 13.

In the case of the first block out of the two blocks, the flow of the one-dimensional DCT data is as follows. That is, the first input device 1→the first selector 2→the first one-dimensional DCT circuits 3→the memory device M→the first selector 2→the first one-dimensional DCT circuits 3 (as a result, two-dimensional DCT processing is performed)→the first output device 4. Further, in the case of the second block, the flow of the one-dimensional DCT data is as follows. That is, the second input device 11→the second selector 12→the second one-dimensional DCT circuits 13→the memory device M→the second selector 12→the second one-dimensional DCT circuits 13 (as a result, two-dimensional DCT processing is performed)→the second output device 14. In other words, the two blocks are processed in parallel simultaneously.

Figure 8:
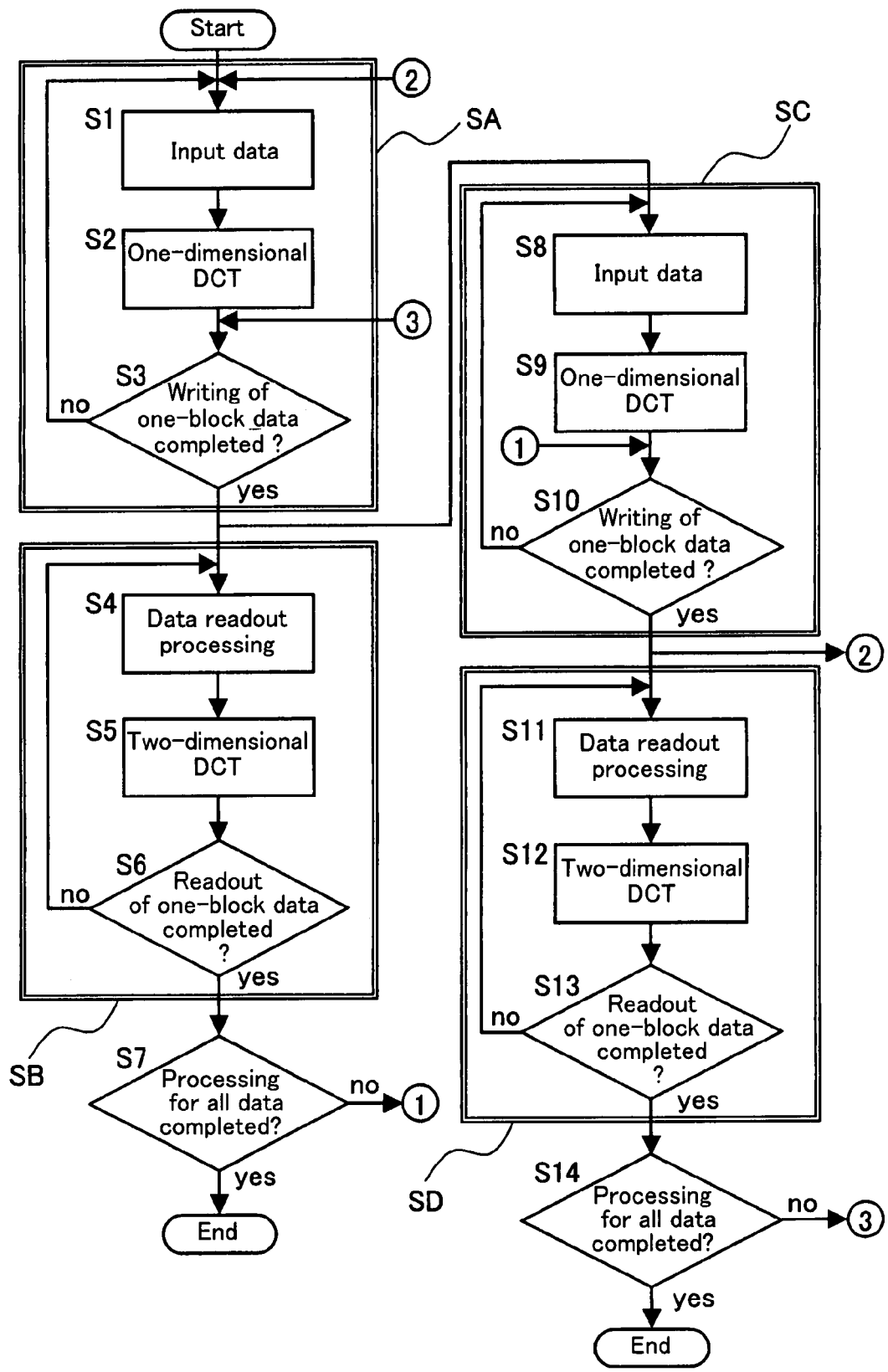
FIG. 8 is a flowchart showing the operation of the two-dimensional DCT device according to the second embodiment of the present invention.
Figure 9A:
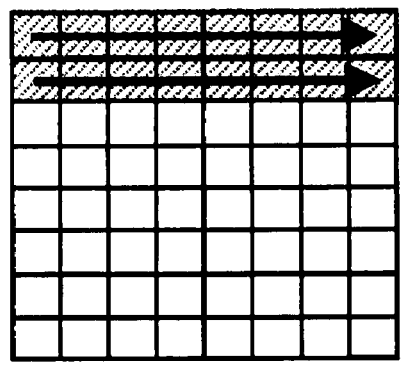
FIGS. 9A-9D are illustrations showing the operation transitions of a memory device of the two-dimensional DCT device according to the second embodiment of the present invention.
Figure 9B:
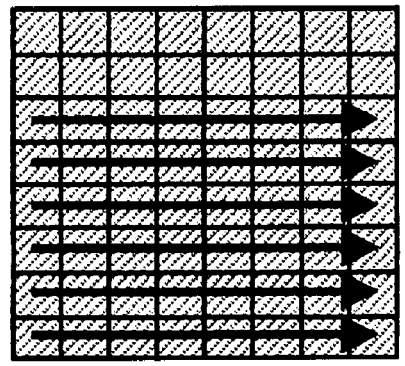
Figure 9C:
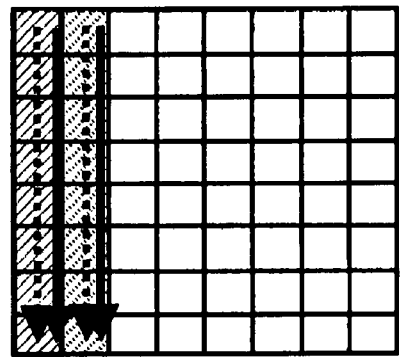

With respect to the two-dimensional DCT device according to the second embodiment that is constituted as described above the operations will be described hereinafter referring to the accompanying drawings. FIG. 8 is a flowchart of the processing in the two-dimensional DCT device according to the second embodiment of the present invention. The same operations as those of the first embodiment are executed from the step S1 to the step S7. At the time when the one-dimensional DCT processing (SA) that is simultaneously executed to two rows in the row direction is completed, the pixel data of different block is inputted from the second input device 11 (step S8), and the second selector 12 outputs the pixel data to the second one-dimensional DCT circuits 13. The first one-dimensional DCT circuits 3 perform two-dimensional DCT processing to the pixel data that is supplied via the first selector 2 (step S5). Further, in conjunction with this processing, the second one-dimensional DCT circuits 13 perform the one-dimensional DCT processing to the pixel data that is supplied via the second selector 12, and stores the processed results to the memory device M (step S9). The data is stored in the column from which the data is read out (see FIG. 9C).

Figure 9D:
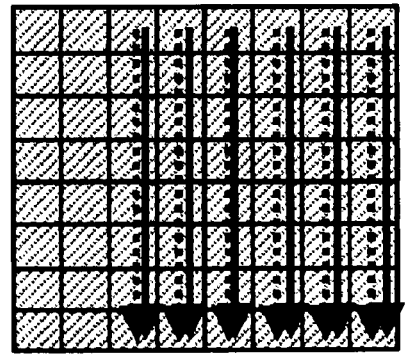

The above-described operations are repeated in parallel by one block, and it is then judged whether or not the readout processing and writing processing corresponding to one block is completed (steps S6 and S10). FIG. 9D can be referred for this judgment process. When the processing by one block is completed (yes in the steps S6 and S10), the input processing via the first input device (step S1) and the readout processing of the pixel data of different block (step S11) is executed in parallel.

Subsequently, simultaneous execution of the one-dimensional DCT processing (SB) to two columns in the column direction and simultaneous execution of the one-dimensional DCT processing (SC) to two rows in the row direction is performed in parallel simultaneously. Further, simultaneous execution of the one-dimensional DCT processing (SA) to two rows in the row direction and simultaneous execution of the one-dimensional DCT processing (SD) to two columns in the column direction is performed in parallel simultaneously.

According to the embodiment constituted in the manner described above, the pixel data of the block that is different from the one in the readout processing is written to each row or each column so as to treat the pixel data of two blocks simultaneously, in writing the pixel data of different blocks inputted from two input devices 1 and 11. As a result, it becomes possible in the embodiment to deal with a plurality of images simultaneously (corresponds to multi-codec).

(Controller)

Figure 10:
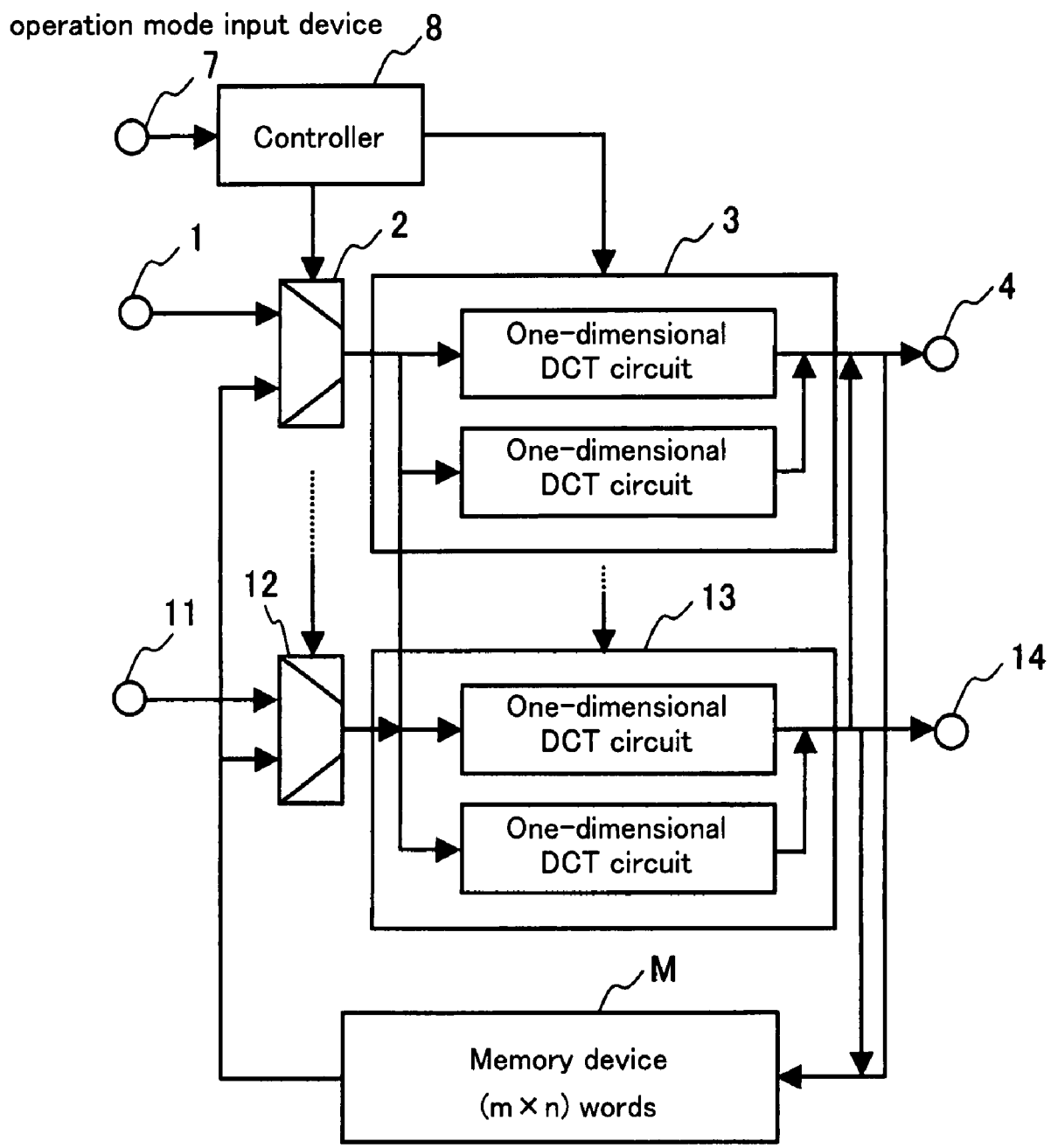
FIG. 10 is a block diagram showing the structure of the two-dimensional DCT device (with a controller) according to the second embodiment of the present invention.

As shown in FIG. 10, the embodiment may further comprise an operation mode input device 7 for inputting the operation mode, and a controller 8 which controls the operations of the selectors 2, 12 and the operations of the one-dimensional DCT circuits 3, 13 based on the operation mode supplied from the operation mode input device 7. In this case, when the data is inputted only from the first input device 1, the controller 8 performs the following control based on the operation mode that is supplied from the operation mode input device 7. That is, the controller 8 performs the processing simultaneously to the data of four rows supplied via the first selector 2 by using the first one-dimensional DCT circuits 3 and the second one-dimensional DCT circuits 13, and then outputs the processed results from the first output device 4.

Meanwhile, when the data is inputted only from the second input device 11, the controller 8 performs the following control based on the operation mode that is supplied from the operation mode input device 7. That is, the controller 8 performs the processing simultaneously to the data of four rows supplied via the second selector 12 by using the first one-dimensional DCT circuits 3 and the second one-dimensional DCT circuits 13, and outputs the processed results from the second output device 14.

As just described, this modification example makes it possible to execute two-dimensional orthogonal transformation at much faster speed through taking the structure that is provided with the operation mode input device 7 and the controller 8.

(Addition of Memory Device)

As shown in FIG. 11, the embodiment may comprise a first memory device M1 and a second memory device M2. In this case, the controller 8 switches the first one-dimensional DCT circuit 3 and the second one-dimensional DCT circuit 13 based on the operation mode that is supplied from the operation mode input device 7. As a result, the first one-dimensional DCT circuit 3 performs the two-dimensional DCT processing by using the first memory device M1, and the second one-dimensional DCT circuit 13 performs the two-dimensional DCT processing by using the second memory device M2. As just described, it becomes possible to perform processing separately to the pixel data of two different blocks by providing the two memory devices M1 and M2. Herewith, much faster two-dimensional orthogonal transformation can be achieved.

(Correspond to Inverse DCT)

Figure 12:
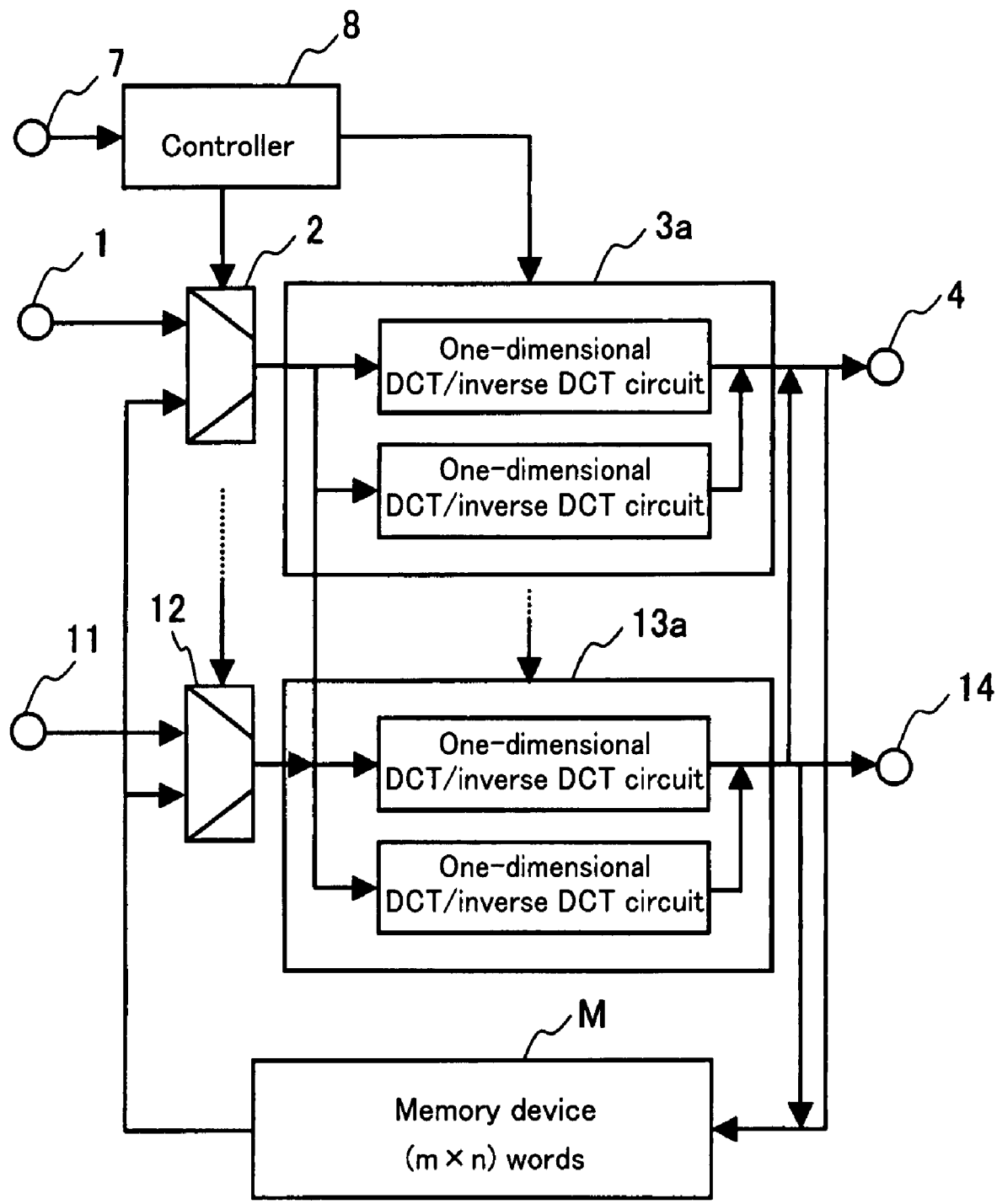
FIG. 12 is a block diagram showing the structure of the two-dimensional DCT device (corresponds to inverse DCT processing) according to the second embodiment of the present invention.

As shown in FIG. 12, It may take such structure that the one-dimensional DCT circuits 3*a* and 13*a* correspond to the inverse DCT processing. In this case, two-dimensional DCT processing is performed to the image data that is inputted via the first input device, and two-dimensional inverse DCT processing is performed to the data that is inputted via the second input device 11. By taking such structure, it becomes possible to perform moving picture processing.

Third Embodiment

Figure 13:
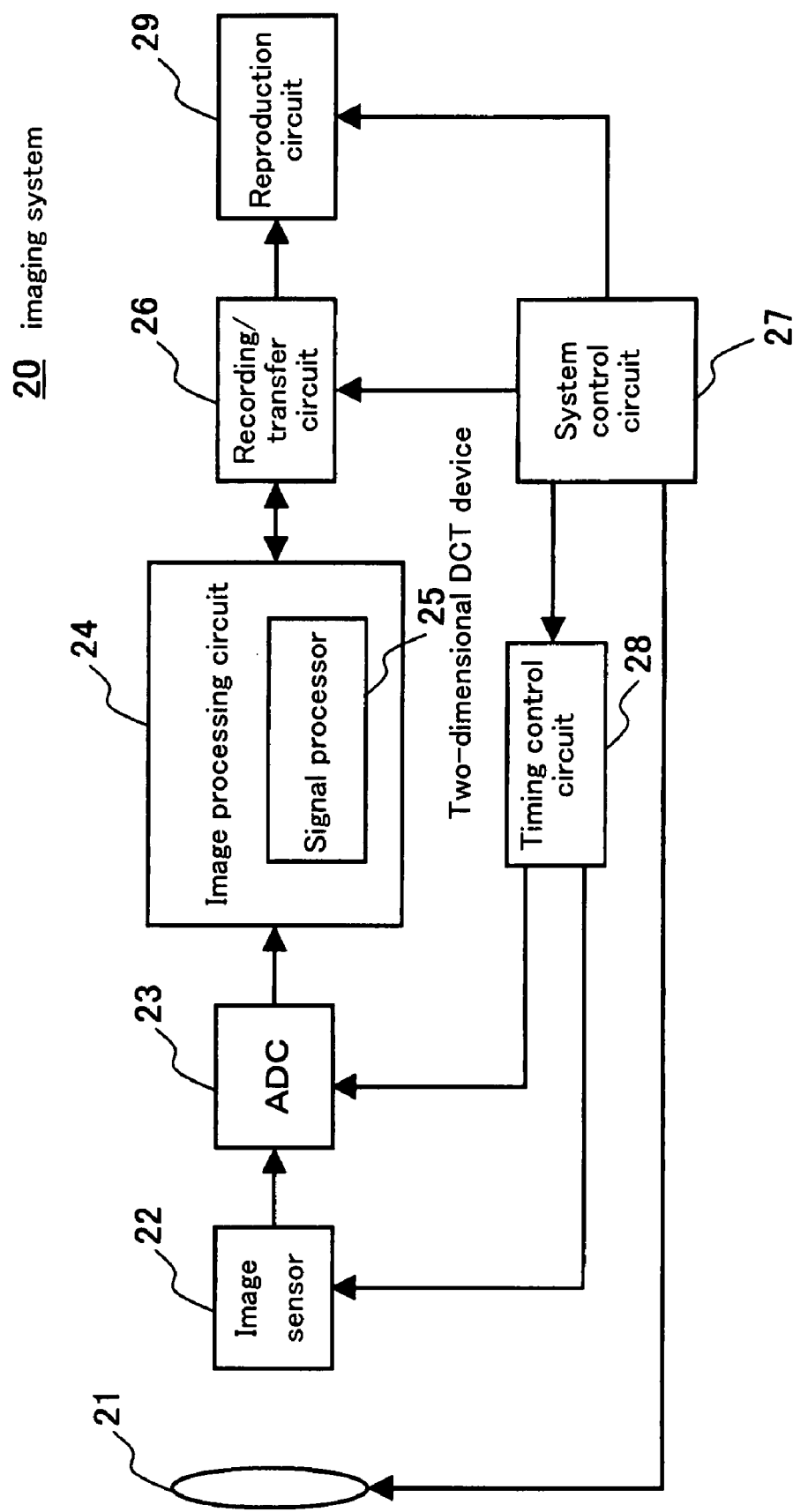
FIG. 13 is a block diagram showing the structure of an imaging system according to a third embodiment of the present invention.
Figure 14:
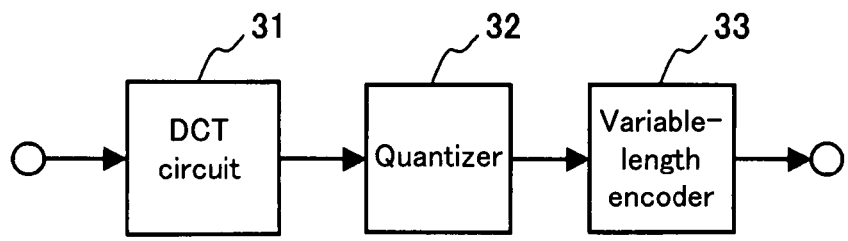
FIG. 14 is a block diagram showing the structure of a typical image encoder.

FIG. 13 is an illustration showing the structure of an imaging system 20 (for example, a digital still camera (DSC)) according to a third embodiment of the present invention. In FIG. 13, reference numeral 21 is an optical system, 22 is an image sensor, 23 is an analog-digital converter (ADC), 24 is an image processing circuit, 25 is a signal processor (two-dimensional DCT device), 26 is a recording transfer circuit, 27 is a system control circuit, 28 is a timing control circuit and 29 is a reproduction circuit. The signal processor 25 is the two-dimensional DCT device described either in the first or the second embodiments. The system control circuit 27 controls the entire imaging system 20.

In this imaging system 20, a subject image entered through the optical system 21 forms an image on the image sensor 22. The image sensor 22 is driven by the timing control circuit 28 to accumulate the optical data of the formed subject image and perform photoelectric conversion so as to obtain electric signals from it. After the electric signals read out from the image sensor 22 are converted into digital signals by the analog-digital converter 23, it is inputted to the image processing circuit 24 including the signal processor 25. The image processing circuit 24 performs image processing such as Y/C processing, edge processing, enlargement/reduction of the image, and image compression/expansion processing of the image by using the present invention. The signals to which the image processing is applied are recorded or transferred to a medium in the recording/transfer circuit 26. The recorded or transferred signals are reproduced with the reproduction circuit 29.

The image processing performed by the signal processor 25 according to the embodiment of the present invention is not applied only to the signals obtained from the subject image that is formed on the image sensor through the optical system 21. It is needless to say that the processing can also be applied to image signals that are inputted as electric signals, for example, from an external device.

The present invention has been described in detail referring to the most preferred embodiments. However, various combinations and modifications of the components are possible without departing from the spirit and the broad scope of the appended claims.

What is claimed is:

1. An orthogonal transformation apparatus wherein two-dimensional orthogonal transformation of pixel data is executed by a block unit of m×n pixels (m and n are natural numbers: m=n, or m≠n) through breaking down said two-dimensional orthogonal transformation into one-dimensional orthogonal transformation of a row direction and a column direction, said orthogonal transformation apparatus comprising:

an input device to which said pixel data of one block is inputted sequentially;

a group of one-dimensional orthogonal transformation devices constituted with a plurality of one-dimensional orthogonal transformation devices which perform one-dimensional orthogonal transformation of said pixel data;

a memory device for storing one-dimensional orthogonal transformation data of one block; and a selector which selects either said pixel data that is inputted via said input device or said one-dimensional orthogonal transformation data that is stored in said memory device, and outputs said selected data to said one-dimensional orthogonal transformation devices, wherein said one-dimensional orthogonal transformation devices: generate said one-dimensional orthogonal transformation data by performing first one-dimensional orthogonal transformation processing simultaneously to a plurality of rows of m-pixels of said pixel data when said pixel data is inputted via said selector, and then store said one-dimensional orthogonal transformation data to said memory device; and also generate two-dimensional orthogonal transformation data by performing second one-dimensional orthogonal transformation processing to said one-dimensional orthogonal transformation data on a plurality of columns of said n-pixels when said one-dimensional orthogonal transformation data corresponding to said plurality of columns of said n-pixels that are stored in said memory device is inputted sequentially via said selector.

2. The orthogonal transformation apparatus according to claim 1, further comprising:
   an information input device for inputting information that shows a characteristic of pixel data inputted from said input device; and
   a clock controller for controlling clocks supplied to said plurality of one-dimensional orthogonal transformation devices, wherein;
   said selector switches said one-dimensional orthogonal transformation devices as an output destination based on said information that is inputted to said information input device; and
   said clock controller supplies a clock only to said one-dimensional orthogonal transformation device that is selected by said selector.

3. The orthogonal transformation apparatus according to claim 1, comprising a plurality of said selectors and a plurality of said one-dimensional orthogonal transformation device groups, wherein
   each of said one-dimensional orthogonal transformation device groups performs processing for executing one-dimensional orthogonal transformation to said pixel data that is inputted via said input device and processing for executing one-dimensional orthogonal transformation to said one-dimensional orthogonal transformation data that is stored in said memory device, in parallel alternately.

4. The orthogonal transformation apparatus according to claim 1, wherein:
   said one-dimensional orthogonal transformation device group comprises
   a first one-dimensional orthogonal transformation device group constituted with a plurality of said one-dimensional orthogonal transformation devices which perform one-dimensional orthogonal transformation to said pixel data, and
   a second one-dimensional orthogonal transformation device group constituted with a plurality of said one-dimensional orthogonal transformation devices which generate second one-dimensional orthogonal transformation data by executing second one-dimensional orthogonal transformation processing to said one-dimensional orthogonal transformation data corresponding to a plurality of columns of said n-pixels that are stored in said memory device; and
   said selector is omitted.

5. The orthogonal transformation apparatus according to claim 1, wherein:
   said input device includes a first input device to which said pixel data of one block is inputted sequentially, and a second input device to which pixel data of another block different from that of said input device is inputted sequentially;
   said selector includes a first selector which selects either said pixel data that is inputted via said first input device or said one-dimensional orthogonal transformation data that is stored in said memory device, and a second selector which selects either said pixel data that is inputted via said second input device or said one-dimensional orthogonal transformation data that is stored in said memory device;
   said one-dimensional orthogonal transformation device group comprises a first one-dimensional orthogonal transformation group and a second one-dimensional orthogonal transformation group;
   said one-dimensional orthogonal transformation devices constituting said first one-dimensional orthogonal transformation device group: generate said one-dimensional orthogonal transformation data by performing first one-dimensional orthogonal transformation processing simultaneously to said pixel data corresponding to a plurality of rows of m-pixels when said pixel data is inputted via said first selector, and then stores said one-dimensional orthogonal transformation data to said memory device; and also generate two-dimensional orthogonal transformation data by performing second one-dimensional orthogonal transformation processing to said one-dimensional orthogonal transformation data corresponding to a plurality of columns of said n-pixels when said one-dimensional orthogonal transformation data corresponding to said plurality of columns of said n-pixels that are stored in said memory device is inputted sequentially via said first selector; and
   said one-dimensional orthogonal transformation devices constituting said second one-dimensional orthogonal transformation device group: generate said one-dimensional orthogonal transformation data by performing first one-dimensional orthogonal transformation processing simultaneously to said pixel data corresponding to a plurality of rows of m-pixels when said pixel data is inputted via said second selector, and then store said one-dimensional orthogonal transformation data to said memory device; and also generate two-dimensional orthogonal transformation data by performing second one-dimensional orthogonal transformation processing to said one-dimensional orthogonal transformation data corresponding to a plurality of columns of said n-pixels when said one-dimensional orthogonal transformation data corresponding to said plurality of columns of said n-pixels that are stored in said memory device is inputted sequentially via said second selector.

6. The orthogonal transformation apparatus according to claim 5, further comprising:
   an operation mode input device to which an operation mode of said apparatus is inputted; and
   a controller for controlling respective operations in said first selector, said second selector, said first one-dimensional orthogonal transformation device and said second one-dimensional orthogonal transformation device based on said operation mode, wherein
   said controller inputs data inputted via either or both of said first selector and said second selector to said first one-dimensional orthogonal transformation device and said second one-dimensional orthogonal transformation device.

7. The orthogonal transformation apparatus according to claim 6, wherein said memory device includes a first memory device and a second memory device for storing said one-dimensional orthogonal transformation data of one block respectively, wherein
   said pixel data inputted via said first input device is stored in said first memory device, and said pixel data inputted via said second input device is stored in said second memory device.

8. The orthogonal transformation apparatus according to claim 1, wherein said first one-dimensional orthogonal transformation device is a discrete cosine transformation device or a Hadamard transformation device.

9. The orthogonal transformation apparatus according to claim 1, wherein said first one-dimensional orthogonal transformation device performs processing including inverse discrete cosine transformation processing or inverse Hadamard transformation processing.

10. An imaging system, comprising:
    an image processing circuit that includes said orthogonal transformation apparatus of claim 1 for performing image processing;
    an image sensor which outputs an image signal to said image processing circuit; and
    an optical system which forms an image of light on said image sensor.

11. The imaging system according to claim 10, further comprising a converter for converting said image signal obtained from said image sensor into a digital signal so as to supply said digital signal to said image processing circuit.

12. An orthogonal transformation method wherein two-dimensional orthogonal transformation of pixel data is executed by a block unit of m×n pixels (m and n are natural numbers: m=n, or m≠n) through breaking down said two-dimensional orthogonal transformation into one-dimensional orthogonal transformation of a row direction and a column direction, said orthogonal transformation method comprising:
    a step for accepting an input of said pixel data of one block sequentially;
    a step for generating one-dimensional orthogonal transformation data through simultaneously executing first one-dimensional orthogonal transformation processing to said pixel data corresponding to a plurality of rows of m-pixels by using a plurality of one-dimensional orthogonal transformation devices;
    a step for storing said one-dimensional orthogonal transformation data corresponding to said plurality of rows by using a memory device for storing said one-dimensional orthogonal transformation data of one block; and
    a step for reading out said one-dimensional orthogonal transformation data corresponding to a plurality of columns of n-pixels from said memory device, and simultaneously performing second one-dimensional orthogonal transformation processing to said readout one-dimensional transformation data of each column by using said plurality of one-dimensional orthogonal transformation devices to generate two-dimensional orthogonal transformation data.

13. The orthogonal transformation method according to claim 12, further comprising:
    a step for accepting information that shows a characteristic of said pixel data to be inputted; and
    a step for restricting operations of said one-dimensional orthogonal transformation devices based on said information to be inputted.

14. The orthogonal transformation method according to claim 13, wherein said information showing said characteristic of said inputted pixel data is a resolution of an inputted image.

15. The orthogonal transformation method according to claim 13, wherein said information showing said characteristic of said inputted pixel data is a frame rate of an inputted moving picture.

16. The orthogonal transformation method according to claim 12, wherein, in said step of restricting said operations of said one-dimensional orthogonal transformation devices, a clock supply to said one-dimensional orthogonal transformation devices, that are controlled to be inactive, is stopped.

17. The orthogonal transformation method according to claim 11, wherein:
    two-dimensional orthogonal transformation step is constituted with a first one-dimensional orthogonal transformation step performed to a plurality of rows of said m-pixels and a second one-dimensional orthogonal transformation step performed to a plurality of columns of said n-pixels; and
    two of said two-dimensional orthogonal transformation steps are included, wherein
    in said two two-dimensional orthogonal transformation steps, said one-dimensional orthogonal transformation processing performed to said pixel data of said two blocks inputted sequentially is executed in parallel alternately with a time lag.

18. The orthogonal transformation method according to claim 17, wherein: in one of said two-dimensional orthogonal transformation steps, said two-dimensional orthogonal transformation step is performed to said pixel data that is accepted in said first one-dimensional orthogonal transformation processing; and in the other of said two-dimensional orthogonal transformation steps, said two-dimensional orthogonal transformation step is performed to said one-dimensional orthogonal transformation data that is stored in said memory device.

19. The orthogonal transformation method according to claim 12, wherein:
    in all said steps, two steps are executed in parallel;
    said second one-dimensional orthogonal transformation processing performed to said one-dimensional orthogonal transformation data that is read out from an odd-numbered block of said memory device and said first one-dimensional orthogonal transformation processing performed to said pixel data accepted in an even-numbered block are simultaneously executed in parallel; and
    said second one-dimensional orthogonal transformation processing performed to said one-dimensional orthogonal transformation data that is read out from an even-numbered block of said memory device and said first one-dimensional orthogonal transformation processing performed to said pixel data accepted in a next odd-numbered block are simultaneously executed in parallel.

20. The orthogonal transformation method according to claim 19, wherein, in each of said one-dimensional orthogonal transformation processing, either or both of said pixel data in said odd-numbered block and said pixel data in said even-numbered block is processed in accordance with an operation mode of an apparatus that executes two-dimensional orthogonal transformation.

21. The orthogonal transformation method according to claim 19, wherein:
    a first memory device and a second memory device, which respectively store said one-dimensional orthogonal transformation data of one block, are used as memory devices; and
    said one-dimensional orthogonal transformation data of said odd-numbered block is stored in said first memory device, and said one-dimensional orthogonal transformation data of said even-numbered block is stored in said second memory device.

22. The orthogonal transformation method according to claim 21, wherein:
    in each of said one-dimensional orthogonal transformation processing, either or both of said pixel data in said odd-numbered block and said pixel data in said even-numbered block is processed in accordance with an operation mode of an apparatus that executes two-dimensional orthogonal transformation; and when either one is processed, processing thereof is performed with said first memory device, and said second memory device is halted.

23. The orthogonal transformation method according to claim 12, wherein said first one-dimensional orthogonal transformation step performs discrete cosine transformation processing or Hadamard transformation processing.

24. The orthogonal transformation method according to claim 12, wherein said first one-dimensional orthogonal transformation step performs processing including inverse discrete cosine transformation processing or inverse Hadamard transformation processing.

* * * * *